US012588589B2

(12) United States Patent
Vande Haar et al.

(10) Patent No.: US 12,588,589 B2
(45) Date of Patent: Mar. 31, 2026

(54) SYSTEMS AND METHODS FOR CONTROLLING HARVESTED MATERIAL FILL PROFILES

(71) Applicant: Deere & Company, Moline, IL (US)

(72) Inventors: William J. Vande Haar, Janesville, IA (US); Riley J. Wegmann, Urbana, IA (US); Moresh Kolhe, Punawale (IN)

(73) Assignee: Deere & Company, Moline, IL (US)

( * ) Notice: Subject to any disclaimer, the term of this patent is extended or adjusted under 35 U.S.C. 154(b) by 268 days.

(21) Appl. No.: 18/597,449

(22) Filed: Mar. 6, 2024

(65) Prior Publication Data

US 2025/0107484 A1 Apr. 3, 2025

Related U.S. Application Data

(60) Provisional application No. 63/587,856, filed on Oct. 4, 2023, provisional application No. 63/587,257, filed on Oct. 2, 2023.

(51) Int. Cl.
*G08B 21/00* (2006.01)
*A01D 41/12* (2006.01)

(52) U.S. Cl.
CPC ................................. *A01D 41/1217* (2013.01)

(58) Field of Classification Search
CPC .................................................. A01D 41/1217
(Continued)

(56) References Cited

U.S. PATENT DOCUMENTS

| | | | |
|---|---|---|---|
| 5,938,714 | A | 8/1999 | Satonaka |
| 6,006,144 | A | 12/1999 | Takahashi et al. |

(Continued)

FOREIGN PATENT DOCUMENTS

| | | |
|---|---|---|
| CA | 2791436 A1 | 4/2014 |
| CA | 2959217 A1 | 8/2018 |

(Continued)

OTHER PUBLICATIONS

German Search Report issued in application No. 102024120820.1 dated Feb. 24, 2025, 10 pages.
(Continued)

*Primary Examiner* — Tai T Nguyen
(74) *Attorney, Agent, or Firm* — Taft Stettinius & Hollister LLP; Stephen F. Rost

(57) ABSTRACT

A fill detection system for controlling and optimizing a discharge of a commodity into a receiving container from a supply container. The system can determine a measured fill profile for the commodity in the receiving container that can be at least partially based on information from one or more height sensing sensors. The system can also determine one or more confidence levels, including with respect to information provided by the height sensing sensors. The system can further utilize an algorithm or model to determine a simulated fill profile. The measured and/or simulated fill profiles can be adjusted, including weighted, based on the confidence value(s) in connection with determining an estimated fill profile. The estimated fill profile can be compared to a desired fill profile in connection with determining whether to continue discharging commodity and/or adjust a location at which commodity is being discharged into the receiving container.

20 Claims, 12 Drawing Sheets

(58) Field of Classification Search
USPC ........................................................ 340/431
See application file for complete search history.

(56) References Cited

U.S. PATENT DOCUMENTS

| | | | |
|---|---|---|---|
| 7,874,899 B2 | 1/2011 | Mackin et al. | |
| 8,032,255 B2 | 10/2011 | Phelan et al. | |
| 8,126,620 B2 | 2/2012 | Ringwald et al. | |
| 8,145,393 B2 * | 3/2012 | Foster | G05D 1/0278 |
| | | | 701/1 |
| 8,380,401 B2 | 2/2013 | Pighi et al. | |
| 8,626,406 B2 | 1/2014 | Schleicher et al. | |
| 8,662,972 B2 | 3/2014 | Behnke et al. | |
| 8,781,692 B2 | 7/2014 | Kormann | |
| 8,868,304 B2 | 10/2014 | Bonefas | |
| 9,014,901 B2 * | 4/2015 | Wang | A01D 41/127 |
| | | | 701/24 |
| 9,043,096 B2 | 5/2015 | Zielke et al. | |
| 9,049,817 B2 | 6/2015 | McCully et al. | |
| 9,113,588 B2 | 8/2015 | Kormann | |
| 9,119,342 B2 | 9/2015 | Bonefas | |
| 9,169,032 B2 | 10/2015 | Gengerke | |
| 9,185,845 B2 | 11/2015 | Van Mill et al. | |
| 9,187,259 B2 | 11/2015 | Van Mill et al. | |
| 9,272,853 B2 | 3/2016 | Van Mill et al. | |
| 9,326,444 B2 | 5/2016 | Bonefas | |
| 9,374,939 B2 | 6/2016 | Pickett et al. | |
| 9,392,746 B2 | 7/2016 | Darr et al. | |
| 9,457,971 B2 | 10/2016 | Bonefas et al. | |
| 9,499,140 B2 | 11/2016 | Lanier et al. | |
| 9,529,364 B2 | 12/2016 | Foster et al. | |
| 9,545,048 B2 | 1/2017 | Pickett et al. | |
| 9,596,805 B2 | 3/2017 | Van Mill et al. | |
| 9,596,809 B2 | 3/2017 | Van Mill et al. | |
| 9,615,509 B2 | 4/2017 | Flickinger et al. | |
| 9,642,305 B2 | 5/2017 | Nykamp et al. | |
| 9,763,389 B2 | 9/2017 | Bump et al. | |
| 9,820,436 B2 | 11/2017 | Inoue et al. | |
| 9,861,040 B2 | 1/2018 | Bonefas | |
| 9,873,570 B2 | 1/2018 | Van Mill et al. | |
| 10,015,928 B2 | 7/2018 | Nykamp et al. | |
| 10,019,790 B2 | 7/2018 | Bonefas et al. | |
| 10,028,434 B2 | 7/2018 | Van Mill et al. | |
| 10,028,441 B2 | 7/2018 | Van Mill et al. | |
| 10,028,442 B1 | 7/2018 | Crosby | |
| 10,106,333 B2 | 10/2018 | Beaujot et al. | |
| 10,278,328 B2 | 5/2019 | Thomson et al. | |
| 10,292,327 B2 | 5/2019 | Ducroquet et al. | |
| 10,351,364 B2 | 7/2019 | Green et al. | |
| 10,406,961 B2 | 9/2019 | Grodecki et al. | |
| 10,664,726 B2 | 5/2020 | Wellington et al. | |
| 10,760,946 B2 | 9/2020 | Meier et al. | |
| 10,765,063 B2 | 9/2020 | Van Mill et al. | |
| 10,807,812 B2 | 10/2020 | Thomson et al. | |
| 10,830,634 B2 | 11/2020 | Blank et al. | |
| 11,008,177 B2 | 5/2021 | Banthia et al. | |
| 11,240,961 B2 | 2/2022 | Anderson et al. | |
| 11,272,667 B2 | 3/2022 | Bump et al. | |
| 11,310,963 B2 | 4/2022 | Burnley et al. | |
| 11,457,562 B2 | 10/2022 | Van Mill et al. | |
| 11,659,788 B2 | 5/2023 | Puryk et al. | |
| 11,825,765 B2 | 11/2023 | Van Mill et al. | |
| 11,930,738 B2 | 3/2024 | O'Connor et al. | |
| 2009/0321154 A1 | 12/2009 | Johnson | |
| 2011/0220677 A1 | 9/2011 | Bertolani | |
| 2012/0099948 A1 | 4/2012 | Bump et al. | |
| 2012/0263560 A1 * | 10/2012 | Diekhans | A01D 43/087 |
| | | | 414/294 |
| 2014/0277963 A1 | 9/2014 | Van Mill et al. | |
| 2014/0286731 A1 | 9/2014 | Van Mill et al. | |
| 2015/0101519 A1 | 4/2015 | Blackwell et al. | |
| 2018/0242521 A1 | 8/2018 | Thomson et al. | |
| 2018/0244477 A1 | 8/2018 | Stilborn et al. | |
| 2019/0322461 A1 | 10/2019 | Banthia et al. | |
| 2021/0195840 A1 | 7/2021 | Puryk et al. | |
| 2021/0294337 A1 | 9/2021 | Van Mill et al. | |
| 2021/0333790 A1 | 10/2021 | Kean et al. | |
| 2022/0071078 A1 | 3/2022 | Boyer et al. | |
| 2022/0197302 A1 | 6/2022 | Mcclelland et al. | |
| 2022/0228902 A1 | 7/2022 | Von Muenster | |
| 2022/0228906 A1 | 7/2022 | Von Muenster | |
| 2022/0348412 A1 | 11/2022 | Cauley | |
| 2022/0397442 A1 | 12/2022 | O'Connor et al. | |
| 2022/0408641 A1 | 12/2022 | Van Mill et al. | |
| 2022/0410704 A1 | 12/2022 | O'Connor et al. | |
| 2023/0031013 A1 | 2/2023 | Faust et al. | |
| 2023/0093038 A1 | 3/2023 | Schlimgen et al. | |
| 2024/0032474 A1 | 2/2024 | Ritter et al. | |

FOREIGN PATENT DOCUMENTS

| | | | |
|---|---|---|---|
| CA | 2959257 A1 | 8/2018 | |
| DE | 102014108449 A1 | 2/2015 | |
| DE | 102022208606 A1 | 2/2023 | |
| EP | 2245916 B1 | 2/2013 | |
| GB | 1104906 A | 3/1968 | |
| JP | 2023027997 A | 3/2023 | |
| WO | 2018102524 A1 | 6/2018 | |
| WO | 2022036114 A1 | 2/2022 | |
| WO | 2023150219 A1 | 8/2023 | |

OTHER PUBLICATIONS

German Search Report issued in application No. 102024136823.3 dated Aug. 14, 2025, 10 pages.
KB Killbros, 1950 Dual-Auger Grain Cart, 2016, 8 pages.

* cited by examiner

FIG. 13

— · — Camera / Measured Fill Profile

——— Estimated Fill Profile

— ·· — Model / Simulated Fill Profile

SYSTEMS AND METHODS FOR CONTROLLING HARVESTED MATERIAL FILL PROFILES

CROSS-REFERENCE TO RELATED APPLICATIONS

The present application is a U.S. non-provisional application that claims the benefit of U.S. provisional application No. 63/587,257, filed on Oct. 2, 2023, and U.S. provisional application No. 63/587,856, filed on Oct. 4, 2023, both of which are incorporated herein by reference in their entirety.

FIELD OF THE DISCLOSURE

The present disclosure generally relates to unloading a commodity into a receiving container, and, more specifically, balancing measured and simulated fill profile determinations based at least in part on a confidence of an accuracy of information to control and optimize the unloading of the commodity into the receiving container.

BACKGROUND OF THE DISCLOSURE

An agricultural harvester, such as a combine, generally accumulates harvested material during operation. During such harvesting operations, the harvested material from the harvester is transferred to a grain cart or wagon that is towed by a tractor and is positioned next to the harvester as the harvester moves through the field. A transfer mechanism, such as an auger, transfers the agricultural material from the harvester to the grain cart or wagon. Once the grain cart or wagon is sufficiently filled, it is moved to a receiving vehicle such as one or more semi-trailers. The tractor operator must drive to the trailer and position the tractor and grain cart relative to a receiving container assembled with the trailer(s) in order to begin unloading the grain cart.

Typically, a tractor operator determines an amount of harvested material that is to be unloaded or transferred and placed in the receiving container. The tractor operator does not want to underfill or not fill the receiving container to an appropriate amount as this is wasteful and will require more repetitions of loading and unloading the receiving container. The tractor operator does not want to overfill the receiving container as spillage can occur in which harvested material falls or spills out of the receiving container which is also wasteful.

SUMMARY

The present disclosure may comprise one or more of the following features and combinations thereof.

In one embodiment of the present disclosure, a system is provided for controlling a discharge of a commodity into a receiving container from a supply container. The system can include at least one sensor positioned to detect at least a height of a portion of the commodity positioned at one or more locations in the receiving container. Additionally, the system can also include at least one processor and a memory coupled with the processor. The memory can include instructions that when executed by the at least one processor cause the at least one processor to determine a simulated fill profile of the commodity in the receiving container based at least on information regarding a geometry of the supply container and a rate at which the commodity is discharged into the receiving container, and sense, using the at least one sensor, at least the height of the portion of the commodity positioned at the one or more locations in the receiving container. Additionally, the memory can include instructions that when executed by the at least one processor cause the at least one processor to determine, using at least the height sensed by the at least one sensor, a measured fill profile of the commodity in the receiving container, and apply a confidence value to at least one of the measured file to attain an adjusted measured fill profile and the simulated fill profile to attain an adjusted simulated fill profile. Further, the memory can include instructions that when executed by the at least one processor cause the at least one processor to determine an estimated fill profile of the commodity in the receiving container based on the adjusted simulated fill profile and the adjusted measured fill profile, and generate one or more signals for control, using the determined estimated fill profile, an operation for the discharge of the commodity to the receiving container.

In another embodiment, a method is provided for controlling a discharge of a commodity into a receiving container from a supply container. A simulated fill profile of the commodity in the receiving container can be determined based at least on information regarding a geometry of the supply container and a rate at which the commodity is discharged into the receiving container. Using at least one sensor, at least a height of a portion of the commodity positioned in the receiving container can be sensed, and, using at least the height sensed by the at least one sensor, a measured fill profile of the commodity in the receiving container can be determined. Additionally, a confidence value can be applied to at least one of the measured fill profile to attain an adjusted measured fill profile and the simulated fill profile to attain an adjusted simulated fill profile. Further, an estimated fill profile of the commodity in the receiving container can be determined based on the adjusted simulated fill profile and the adjusted measured fill profile. Using the determined estimated fill profile, an operation can be controlled for the discharge of the commodity to the receiving container.

These and other features of the present disclosure will become more apparent from the following description of the illustrative embodiments.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein:

FIG. 13 is a schematic diagram of a system for determining a simulated fill profile for a commodity;

Corresponding reference numerals are used to indicate corresponding parts throughout the several views.

DETAILED DESCRIPTION

Figure 1A:
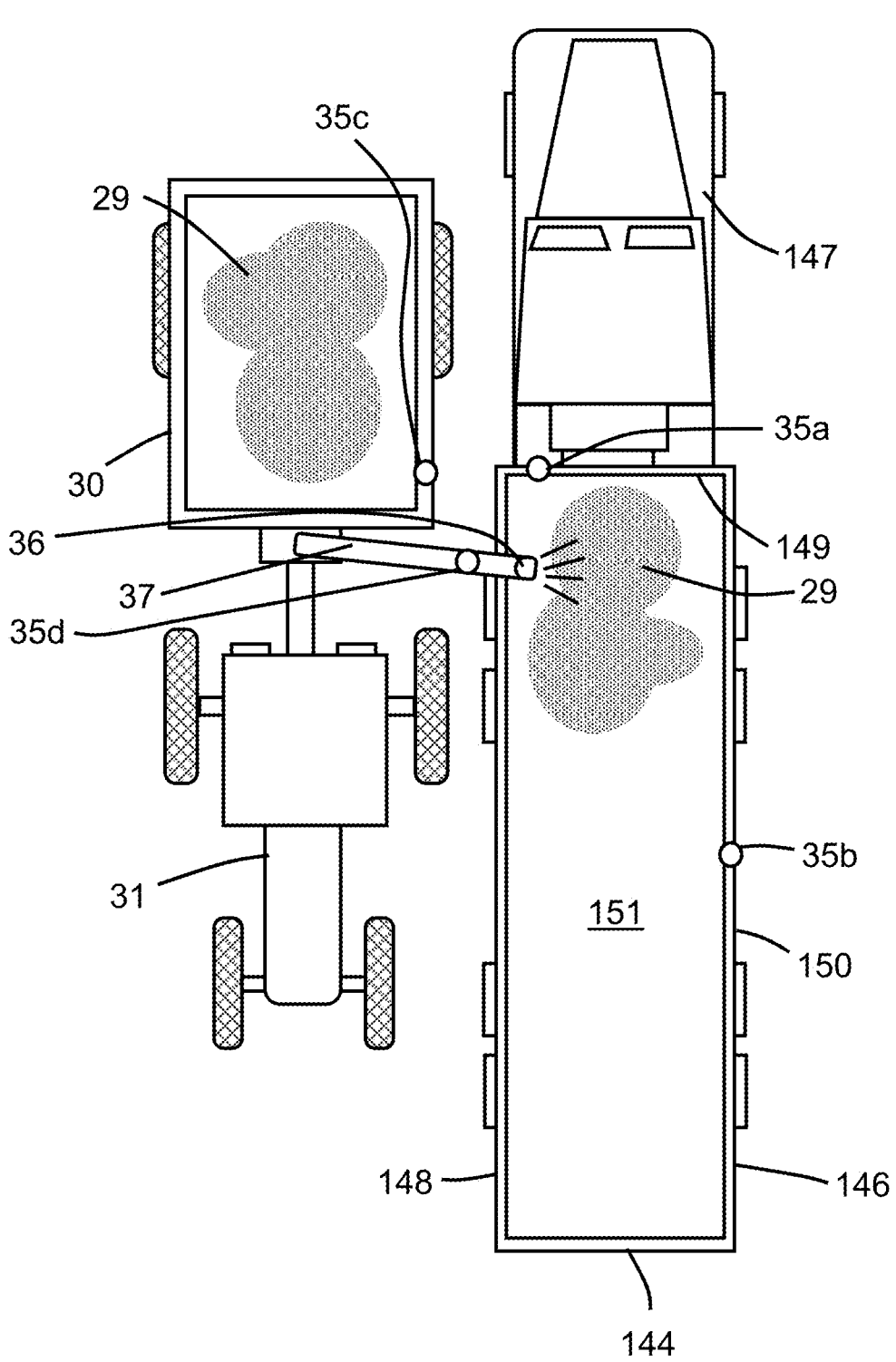
FIG. 1A illustrates a top view of an exemplary representation of a commodity in the form of a harvested material being unloaded from a supply container to a receiving container.

The embodiments of the present disclosure described below are not intended to be exhaustive or to limit the disclosure to the precise forms in the following detailed description. Rather, the embodiments are chosen and described so that others skilled in the art may appreciate and understand the principles and practices of the present disclosure.

Various types of agricultural and construction operations can involve a commodity being transferred, including unloaded, from a supply container that currently has the commodity to a receiving container that is to receive the unloaded commodity. For example, in certain agricultural operations, a supply container can be a combine or a harvester, including a forage harvester, that fills a supply container, such as, for example, a grain cart, wagon, or tailer, that may, or may not, be pulled by a tractor, with a commodity, such as, for example, a harvested material, including, but not limited to grain and sugar cane, among other crops. Further, in an other example, the supply container, such as, for example, the grain cart, trailer, or wagon, can be to the storage container from which the commodity is to be transferred to another form of receiving container, such as, for example, a trailer or semi-trailer, that may be, or is to be, coupled to a truck, including a semi-truck. However, different types of supply and receiving containers can be utilized different types of industries and/or commodities.

In accordance with various embodiments described below, one or more sensors, such as, for example, one or more cameras of a fill detection system, or an associated visual system, are placed on any of a receiving container and a supply container, including, for example, any of a tractor, wagon, grain cart, semi-truck, and/or combine or harvester. The visual system, or associated sensors, provide real-time measurements regarding at least a commodity that is unloaded into the receiving container. According to certain embodiments, the sensors, which can be part of a height sensing technology or system (generally referred to herein as a height sensing system), can be mounted or positioned in other locations, such as, for example, on prime movers of the receiving or supply containers, drone(s), or a mobile or stationary ground viewing systems, to name a few. Moreover, the sensors, and thus the associated height sensing system, can be part of, or otherwise communicatively coupled to, a visual system that can at least detect a fill profile of the commodity in the receiving container, including, for example, a shape, size, distribution, and height of commodity at one or more locations within the receiving container. Such information obtained by the sensor can be used to obtain a measured fill profile for the commodity in the receiving container. The accuracy of the information obtained by the sensor(s) that is used to determine the measured fill profile can also be evaluated in connection with determining a confidence value for that information, and thus for the associated measured fill profile.

The fill detection system can also use one or more algorithms or models to determine a simulated fill profile that can correspond to an anticipated fill profile for the commodity in the receiving container. According to certain embodiments, information utilized for the simulated fill profile may not include information obtained by the one or more sensors. Instead, the algorithms or models used for the simulated fill profile can by different than the information used for the measured fill profile, and can instead include the geometry of the receiving container, a commodity flow rate, an angle of repose of the commodity, and/or the location where commodity is falling into the receiving container, among other information.

A comparison of the measured fill profile and the simulated fill profile can be used to generate an estimated fill profile. According to certain embodiments, sensor fusion, Kalman filters, or other techniques can be employed to give more weight, value, or consideration of the measured fill profile over the simulated fill profile, or vice versa, based on a determined confidence of the measured fill profile over the simulated fill profile, or of the underlying data or information used to determine the associated measured fill profile over the simulated fill profile.

Additionally, according to certain embodiments, self or machine learning, among other techniques, can be utilized to improve the accuracy of the model(s) or algorithm(s), including associated coefficients. Such self or machine learning can be accomplished in a variety of manners. For example, according to certain embodiments, when the determined confidence of the measured fill profile, or associated data is high and/or satisfies a threshold, the measured fill profile can be compared to the associated simulated threshold. Such an approach can be generally continuously applied, and, more specifically, applied to a plurality to measured fill profiles and the associated simulated thresholds to identify differences and/or patterns in terms of at least differences and the measured and simulated fill profiles. Such identified difference and/or patterns can then be used, such as, for example, by artificial intelligence engine or neural network to determined adjusts that can improve the accuracy of the model(s) or algorithm(s) used for the simulated fill profile.

As discussed below, the sensors and/or visual system may continuously or substantially continuously, including generally in real-time, provide information to a controller, including, but not limited to an automation controller or other suitable device, as well as combinations thereof, that can identify desired fill profile parameters and simulated fill profile parameters, which can be selectively utilized in adjusting and/or optimizing the final fill that is to be attained for commodity in the receiving container. In some embodiments, the controller is included in the visual system, including, but not limited to, an automation controller. However, in other embodiments, the controller, which again may, or may not, be an automation controller, is operatively coupled to the visual system.

The visual system can thus include one or more height sensing systems that can utilize one or more types of height sensing sensors, including, for example, cameras and emitter/receiver types sensors, as well as combinations thereof, among other types of sensors, to detect, or provide information used to determine, a height, profile, distribution, and/or location of the commodity, such as harvested material, at least in the receiving container. Further, although reference is made herein to a "visual" system, such a visual system can include one or more height sensing systems that may, or may not, be considered "visual" sensing systems. For example, according to certain embodiments the visual system can include, or utilize, one or more of an optical, vision, and/or camera sensor systems, among others, and associated sensors. Alternatively, or additionally, the visual system can utilize one or more non-visual height sensing systems, such as, for example, systems that utilize radar, lidar or light detection and ranging, ultrasonic, radio waves, and/or electromagnetic waves, to name a few.

Referencing FIG. 1A, a supply container 30, such as, for example, a grain cart, is typically coupled to a tractor 31 for unloading a commodity 29, such as, for example, grain or sugar cane, among other harvested material, into a receiving container 150 that can be coupled to a semi-truck 147. During this unloading operation, the semi-truck 147 is usually stationary, but may move in some forms. Further, to the extent the tractor 31 is operated by an operator, and moreover is not an autonomous vehicle, the operator of the tractor 31 and supply container 30 will typically approach the receiving container or trailer 150 from the operator's left side. However, to the extent embodiments described or illustrated herein identify the unloading of the commodity 29 as occurring on the operator's left side, it is expressly contemplated that such unloading can be practiced using either side of the supply container 30, as well as include unloading from either side of the receiving container 150. With respect to at least certain types of supply containers 30, in order to initiate the unloading operation, the operator of tractor 31 positions tractor 31 to drive alongside receiving container 150, and will engage suitable hydraulics to fine tune the position of a chute 36 of the supply container 30 over the receiving container 150. Additionally, while exemplary embodiments discussed herein refer to use of a tractor 31 for movement of the supply container 30, according to other embodiments, the container 30 can be a self propelled, autonomous, or semi-autonomous vehicle in which features discussed herein relating to the tractor 31 can be performed by the supply container 30. Similarly, the tractor 31 may be operated via an operator of the tractor, or can otherwise be an autonomous or semi-autonomous vehicle.

Figure 1B:
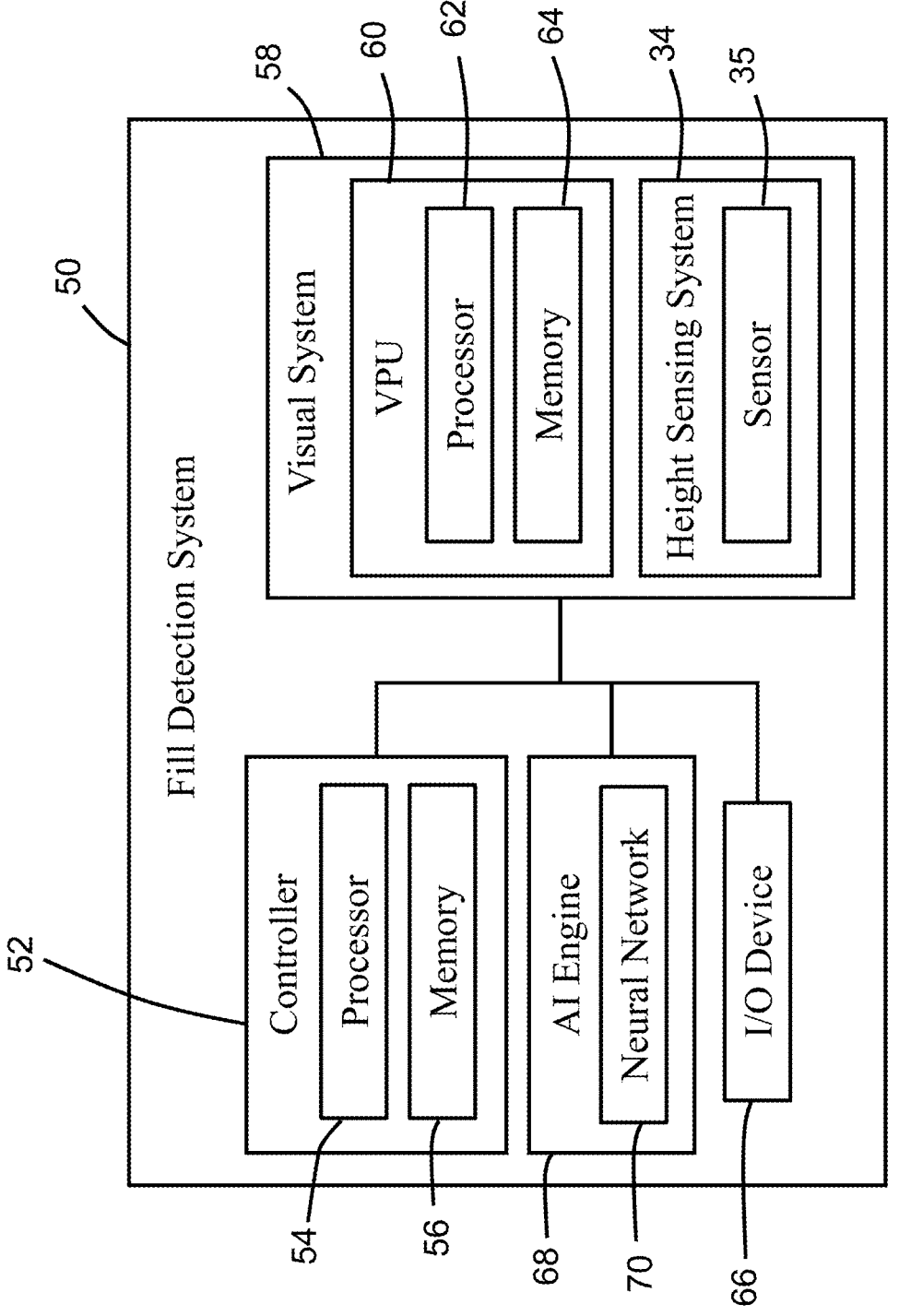
FIG. 1B illustrates a simplified block diagram of a fill detection system for controlling a fill of a commodity in a receiving container.

FIG. 1B illustrates a simplified block diagram of a fill detection system 50 for controlling a fill of a commodity in a receiving container 150. The fill detection system 50 can be located at a single location, or distributed about multiple locations, including being positioned at one or more of the storage container 30, tractor 31, receiving container 150, or the semi-truck 147, as well as combinations thereof, among other locations. As seen, the fill detection system 50 can include a controller 52 having one or more processors 54 and a memory 56. The controller 52 can be, or can include, an automation controller. The processor 54 may be one or more single or multi-core processors, microcontrollers, or other processor or processing/controlling circuits. For example, according to certain embodiments, the processor 54 may include or be embodied as an arithmetic logic unit (ALU), central processing unit (CPU), digital signal processor (DSP), artificial intelligence (AI) acceleration unit, graphics processing unit (GPU), tensor processing unit (TPU), and/or another suitable processor(s). The processor 54 may be a programmable type, a dedicated hardwired state machine, or a combination thereof. The processor 54 can be associated with multiple processing units that may utilize distributed, pipelined, and/or parallel processing in various embodiments. Further, the processor 54 may be dedicated to performance of just the operations described herein, or may be utilized in one or more additional applications. In the illustrative embodiment, the processor 54 is programmable and executes algorithms and/or processes data in accordance with operating logic as defined by programming instructions (such as software or firmware) stored in the memory 56. Additionally, or alternatively, the operating logic for the processor 54 may be at least partially defined by hardwired logic or other hardware. Further, the processor 54 may include one or more components of any type suitable to process the signals received from an input/output (I/O) device 68 or from other components or devices and to provide desired output signals. Such components may include digital circuitry, analog circuitry, or a combination thereof.

The memory 56 may be of one or more types of non-transitory computer-readable media, such as a solid-state memory, electromagnetic memory, optical memory, or a combination thereof. Furthermore, the memory 56 may be volatile and/or nonvolatile and, according to certain embodiments, some or all of the memory 56 may be of a portable type, such as a disk, tape, memory stick, cartridge, and/or other suitable portable memory. In operation, the memory 56 may store various data and software used during operation of the fill detection system 50, such as operating systems, applications, programs, libraries, and drivers. The memory 56 may store data that is manipulated by the operating logic of the processor 54, such as, for example, data representative of signals received from and/or sent to the I/O device 68 in addition to or in lieu of storing programming instructions defining operating logic. The memory 56 may be included with the processor 54 and/or coupled to the processor 54 depending on the particular embodiment. For example, according to certain embodiments, the processor 54, the memory 56, and/or other components of the fill detection system 50 may form a portion of a system-on-a-chip (SoC) and be incorporated on a single integrated circuit chip.

The fill detection system 50 can also include a visual system 58 that can include a vision processing unit (VPU) 60 that can include one or more processors 60 and a memory 62. According to certain embodiments, the processor(s) 62 and/or memory 64 of the VPU 60 can be part of, in addition to, or separate from, the processor(s) 54 and/or memory 56, respectively, of the controller 52. Further, the above description of the processor 54 and memory 56 of the controller 52 can also be applicable to the processor(s) 62 and memory 64 of the VPU 60.

As also seen in FIG. 1B, the visual system 58 can include a height sensing system 34, including and or more associated sensors 35. As seen in FIG. 1A, according to certain embodiments, one or more of the sensors 35 of the visual system 58, including, for example, one or more cameras 35a-d, are mounted on any of the supply container 30, tractor 31, or receiving container 150, as well as combinations thereof, to image the receiving container 150 and/or the semi-truck 147. The controller 52 and/or VPU 60 is operatively coupled with the one or more sensors 35 to receive and process information, such as, for example, images, obtained by the one or more sensors 35 to detect the receiving container 150. Non-limiting example embodiments of the sensors 35 include cameras 35a-d, including, for example, monocular or stereovision cameras, among other types of cameras.

The operator, controller 52, and/or another controller on the supply container 30 can engage a conveyance device 37 of the supply container 30 that is utilized to transfer, including unload, the commodity from the supply container 30 to an interior area 151 of the supply container 150. A variety of conveyance devices 37 can be utilized, including, but not limited to, an auger or conveyor, among others. In the illustrated embodiment in which the conveyance device 37 includes an auger, the supply container 30 and/or tractor 31 can control an auger gate position using tractor hydraulics in order to begin the flow of commodity, such as a harvested material, through a chute or spout 36 of, or coupled to, the conveyance device 37, and into the interior area 151 of the receiving container 150. Further, as discussed below, the commodity can be unloaded into the receiving container 150 to attain a desired fill profile, a simulated fill level, and/or an estimated fill level, as described in more detail below. As the harvested material begins to fill at least a portion of the interior area 151 of the receiving container 150, the operator and/or the controller 52 can cause the tractor 31 to move in a direction such that the chute or spout 36 is displaced rearwardly in the receiving container 150. In this way, the receiving container 150 is generally filled from one direction to another, such as, for example, from the front to the rear of the receiving container 150. However, unloading can also occur with the supply container 30 approaching from the opposite side and filling from the rear to the front of receiving container 150. Further still, in other situations, the receiving container 150 can be filled from the rear to the front of the receiving container 150 by operating the tractor 31 to travel in reverse.

Figure 2:
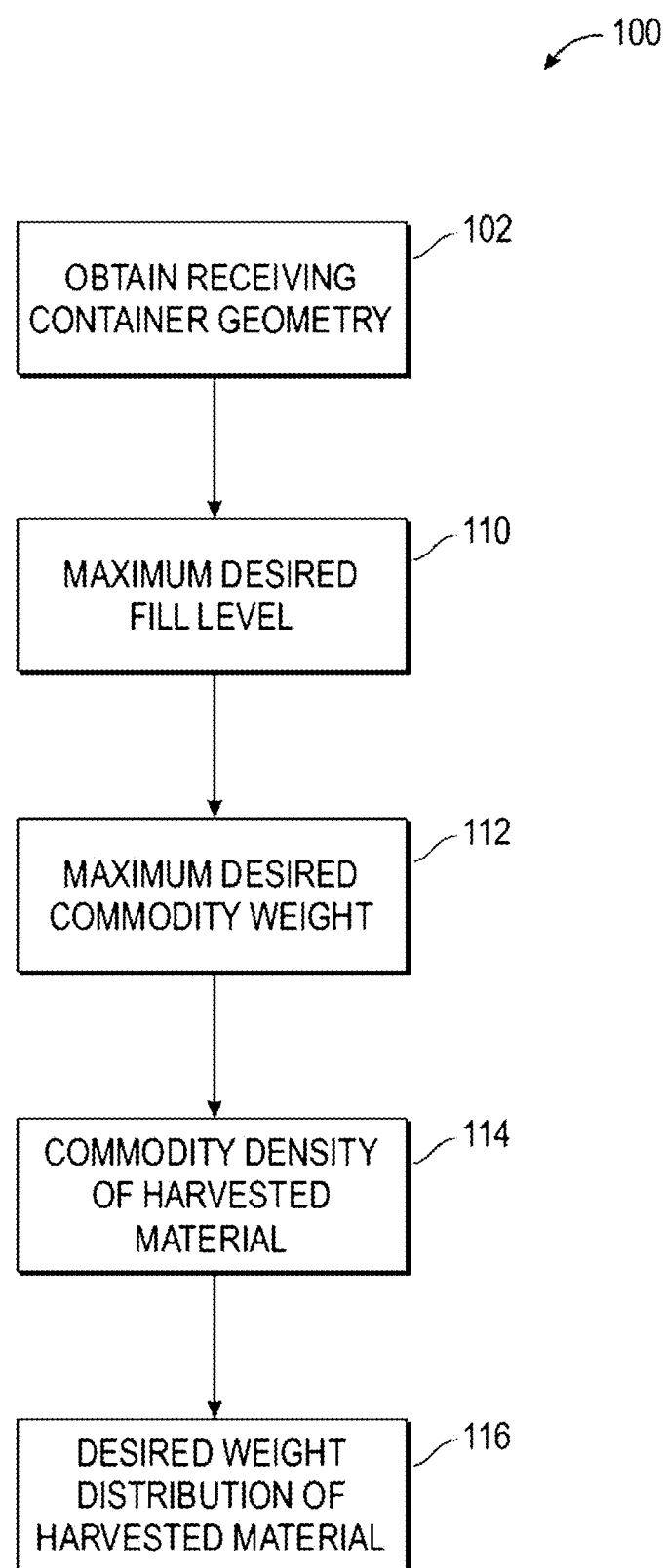
FIG. 2 is a flow diagram of a method of determining a desired fill profile of a commodity before the commodity is passed into a receiving container in accordance with one embodiment.

FIG. 2 is a flow diagram of an exemplary method 100 of determining a desired fill profile for commodity in the receiving container 150. The method 100 can, according to certain embodiments, be performed such that the desired fill profile for the commodity is determined before the harvested material is unloaded into the receiving container 150. The method 100 corresponds to, or is otherwise associated with, performance of the blocks described below in the illustrative sequence of FIG. 2, and can be carried out, for example, by the exemplary fill detection system 50 shown in FIG. 1B. It should be appreciated, however, that the method 100 can be performed in one or more sequences different from the illustrative sequence. Additionally, one or more of the blocks mentioned below may not be performed, and the method 100 can include steps or processes other than those discussed below.

Figure 3:
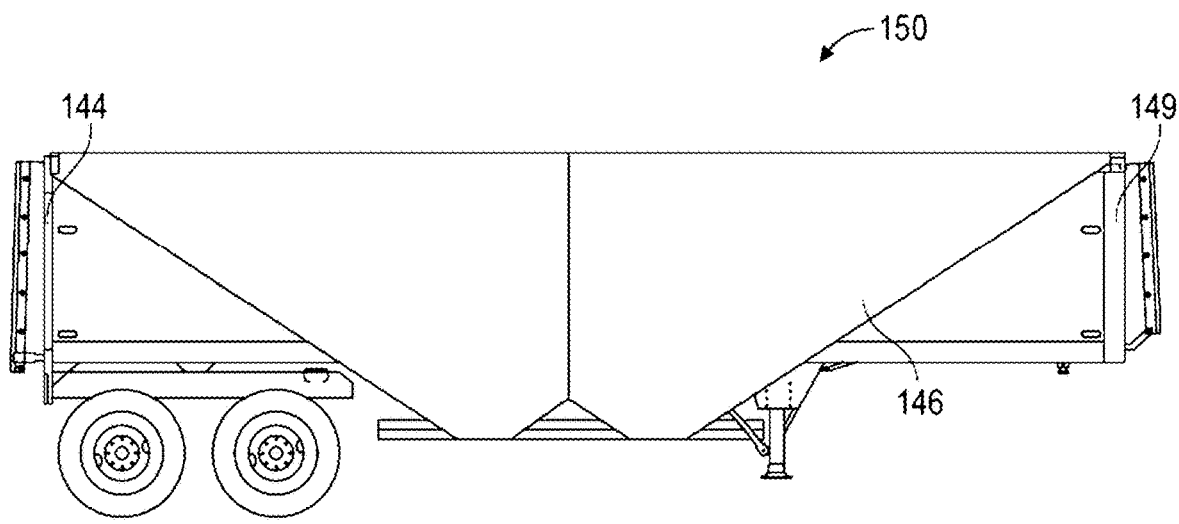
FIG. 3 is a side view of the receiving container of FIG. 2.

The method 100 can begin at block 102 where a desired fill profile parameter, such as, for example, a receiving container geometry, can be obtained for and/or from the receiving container, such as, for example, for/from the receiving container 150 illustrated in FIG. 3. For simplicity, reference is made herein to the exemplary embodiment of the receiving container 150 shown in at least FIGS. 1A and 3, which may, for example, include a plurality of walls 144, 146, 148, 149 and a floor that can form, or at least partially define, at least a portion of the interior area 151 of the receiving container 150. Further, in the illustrated example, the receiving container 150 is configured to selectively retain a harvested material. However, other receiving containers 150 can have different configurations that are associated with receiving other types of commodities. Moreover, other types and shapes of receiving containers, including, for example, grain carts, trailers, and wagons, can be different than that shown in FIGS. 1A and 3.

The receiving container geometry can include the shape and volume of the receiving container 150, as well as information regarding the positioning and/or configuration of the front and rear axles of the receiving container 150. Further, the receiving container geometry can include the length, width, and/or internal dimensions for the floor and walls 144, 146, 148, 149 of the receiving container 150, among other information. The floor and walls 144, 146, 148, 149 of the receiving container 150 can have a variety of different configurations, including, for example, be vertical, sloped or horizontal, as well as various combinations thereof, among other configurations and orientations.

The receiving container geometry can be obtained in a variety of manners. For example, according to certain embodiments, the receiving container geometry can be obtained by a user entering identification information for the receiving container 150, such as, for example, a model number, among or other suitable identification information, into the I/O device 68 that is communicatively coupled to the controller 52. Using such inputted identification information, the controller 52 can retrieve from a data store receiving container geometry information corresponding to that identified receiving container 150. Such retrieved receiving container geometry information can include, for example, a dimensional model of the supply container 30, among other dimensional or capacity information. Alternatively, or additionally, one or more automatic receiving container detection techniques can be used, including in connection with operation of the controller 52, to attain, including retrieve and/or derive, information regarding the receiving container geometry, including the dimensional model. Examples of automatic receiving container detection can include electronically querying the receiving container, such as by interacting with an radio frequency identification (RFID) tag on the receiving container 150, optically identifying the receiving container 150 either by measuring the receiving container 150 or using a sensor 35, such as, for example, a camera, or optically identifying visual indicia on the receiving container, such as a QR code or bar code. Any other suitable other technique for obtaining the receiving container model can also be utilized. Accordingly, method 100 can employ attaining, including deriving, retrieving, or receiving container geometry in connection with determining a desired fill profile.

Figure 4:
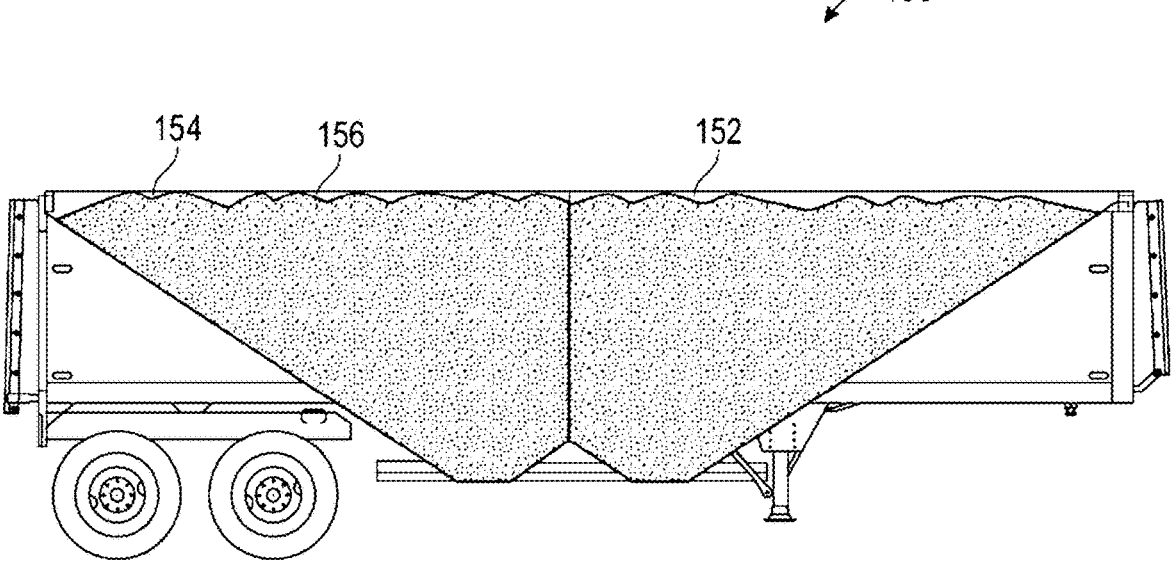
FIG. 4 is a side view of a maximum or first desired fill profile of the commodity in the receiving container of FIG. 3.

At block 110, a desired fill profile parameter, which can be a maximum desired fill level 152 of the receiving container 150, as illustrated in FIG. 4, can be determined, such as, for example, by the fill detection system, including, for example, by the controller 52. Moreover, the maximum desired fill level 152 can correspond to a maximum height at which a particular commodity, in this case a harvested material, can attain within the receiving container 150 while also preventing spillage of that commodity out of the receiving container 150 during transport of the receiving container 150 with the harvested material therein. The maximum desired fill level 152 can be influenced by the terrain on which the receiving container 150 is located and the commodity angle of repose, which, again, can be harvested material. The maximum desired fill level 152 can be determined as a distance from a top edge 154 of the receiving container 150 to a top surface 156 of the commodity/harvested material as measured in units such length, such as, for example, inches or centimeters. The maximum desired fill level 152 can be determined by user input, such as by a semi-truck operator, a farm manager, or a tractor operator, automatically, such as by the controller 52, or by other techniques. Accordingly, the method 100 can employ the maximum desired fill level 152 in connection with determining a desired fill profile.

At block 112, user input, such as, for example, by a semi-truck operator or a tractor operator, the controller 52, and/or other techniques can be used to determine one or more desired fill profile parameters. For example, according to certain embodiments, at block 112, a desired fill profile parameter that is a maximum desired commodity weight in the receiving container 150 can be determined. The maximum desired commodity weight can be the maximum weight of the commodity, in this example harvested material, that can be added to the receiving container 150. Moreover, typically receiving containers 150 have a maximum weight, which can be the maximum combined weight of at least the storage container 150 and the commodity in the storage container 150. The maximum desired commodity weight can thus, for example, be the difference between at least the weight of the storage container 150 and the maximum weight for the combination of the storage container 150 and the commodity within the storage container 150. The maximum desired commodity weight has a weight or mass value that is typically measured in units of pounds or kilograms. Accordingly, method 100 can also employ the maximum desired commodity weight in connection with determining a desired fill profile.

At block 114, user input, such as, for example, by a semi-truck operator or a tractor operator, the controller 52, and/or other techniques can be used to determine another desired fill profile parameter, such as, for example, a commodity density. With respect to at least commodities in the form of harvested materials, the commodity density can vary, including, for example, with respect to the type of harvested material, including, but not limited to grain type, and humidity level. The commodity density can, for at least harvested material, be a value with units such as pounds/bushel or kilograms/cubic meter.

The humidity level used for determining the commodity density can, for example, be sensed by one or more humidity sensors, among or other detecting means. The humidity sensors can be placed at any location at which the humidity sensors may contact the harvested material. For example, the humidity sensors can be placed in the receiving container 150, the supply container 30, and/or the tractor 31, among other locations. In one embodiment, both the humidity and commodity type, such as, for example, harvested material type, including grain type, are recorded and stored in the controller 52 and/or as part of harvest systems telematics data. The commodity density can also be determined by assuming a commodity density by the operator or receiving a commodity density from an external source, among other manners of determining the commodity density. One example of an external source includes a combine providing the density of the grain it is filling into a grain cart before the grain cart is utilized as a supply container 30, and, moreover, before the grain cart/supply container 30 starts unloading the grain into a receiving container 150. Accordingly, method 100 can also employ the commodity density, such as the commodity density of the harvested material, in connection with determining a desired fill profile.

At block 116, user input, such as, for example, by a semi-truck operator, combine operator, computer automation operator, or tractor operator, the controller 52, and/or other techniques can be used to determine another desired fill profile parameter, such as, for example, a desired weight distribution of the commodity across and/or along a longitudinal length of the receiving container 150. The desired weight distribution of the commodity can be determined by user input, automatically, or other techniques. The desired weight distribution of the commodity, such as, for example, harvested material, can be obtained by a user entering this information, via an I/O device 68, for the controller 52, which again, may or may not be part of the visual system 58. Alternatively, one or more automatic techniques can used by the controller 52 to determine the desired weight distribution in the receiving container 150. Additionally, any suitable other technique for desired weight distribution can also be utilized. Exemplary embodiments of desired weight distribution of the harvested material are illustrated in FIGS. 4-8 and described below.

A first desired weight distribution of the harvested material is illustrated in FIG. 4 and corresponds to a maximum desired fill level 152. In this example, the maximum desired fill level 152 includes the commodity (e.g., harvested material) being generally level along the longitudinal length of the interior area 151 of the receiving container 150. Further, as illustrated, in this example, the top surface 156 of the harvested material is very close to the top edge 154 of the receiving container 150. In situations similar to that demonstrated by the example shown in FIG. 4 in which the weight distribution corresponds to the maximum desired fill level 152 of harvested material, the density of the harvested material, including grain, is typically low and/or the weight of the harvested material is less of a concern.

Figure 5:
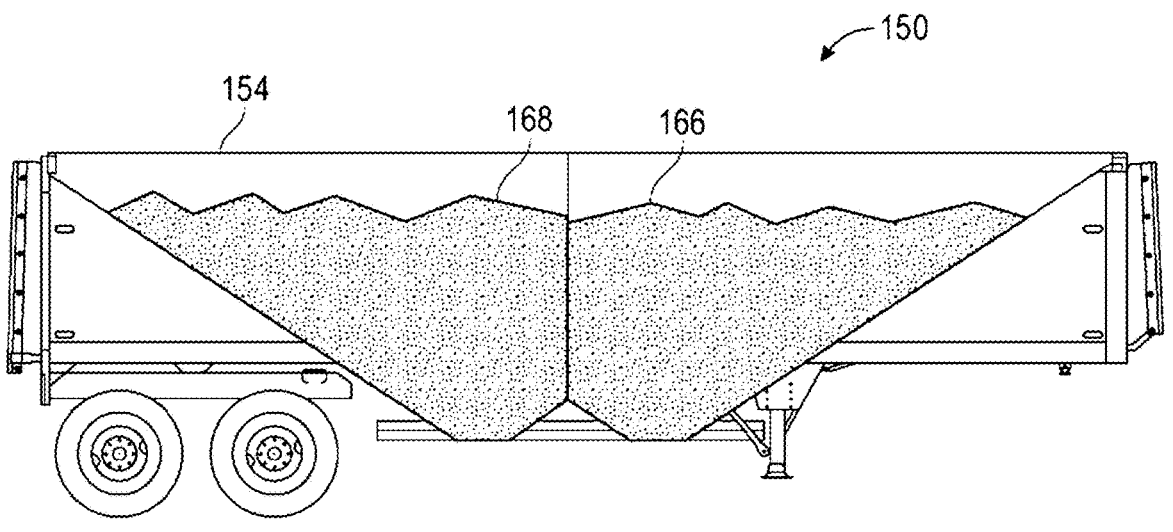
FIG. 5 is a side view of a second desired weight distribution of the commodity in the receiving container of FIG. 3.

A second desired weight distribution of the harvested material is illustrated in FIG. 5, and corresponds to a maximum desired fill weight 166. Similar to the distribution shown in FIG. 4, the harvested material shown in FIG. 5 is generally level along the longitudinal length of the receiving container 150. However, a top surface 168 of the harvested material in FIG. 5 is a distance from the top edge 154 of the receiving container 150 that is greater than the corresponding distance between the top surface 156 of the harvested material and the top edge 154 of the receiving container 150 shown in FIG. 4. In situations similar to that demonstrated by the example shown in FIG. 5 in which the weight distribution corresponds to the maximum desired fill weight 166, the harvested material or grain density, at least relative to the density of the harvested material shown in FIG. 4, is typically high and/or the weight of the harvested material is more of a concern.

Figure 6:
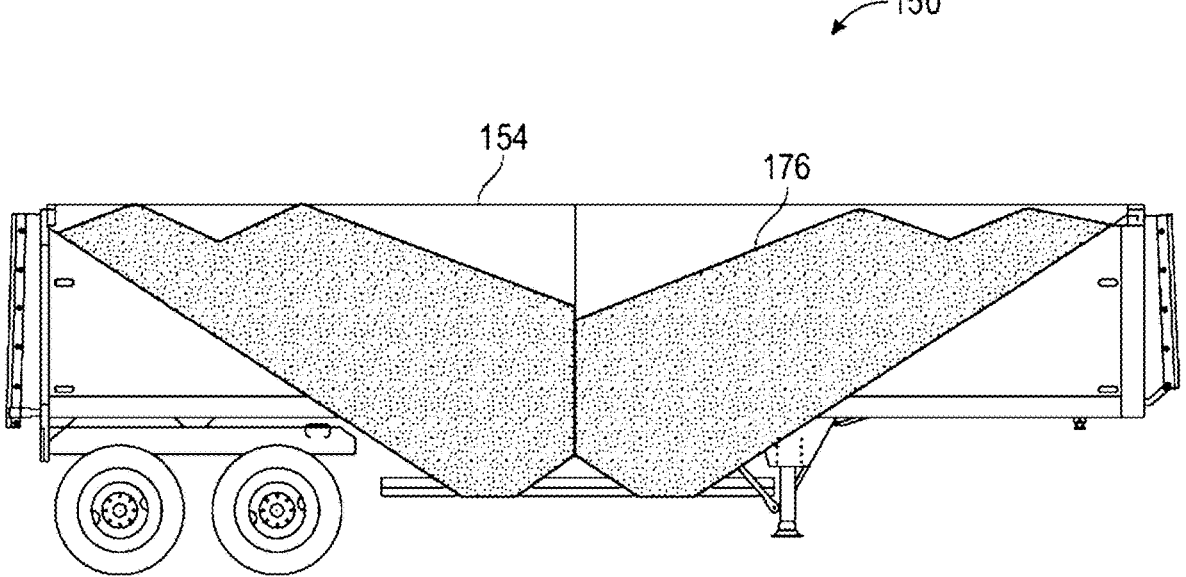
FIG. 6 is a side view of a third desired weight distribution of the commodity in the receiving container of FIG. 3.

A third desired weight distribution, which can be referred to as a concentrated axle distribution 176 of the harvested material is illustrated in FIG. 6. As illustrated, with the concentrated axle distribution 176, the harvested material is distributed within the receiving container 150 so that, compared to the amount of harvested material positioned in a mid-portion of the receiving container 150, a greater amount or quantity of harvested material is positioned over front and rear axles of the receiving container 150.

Figure 7:
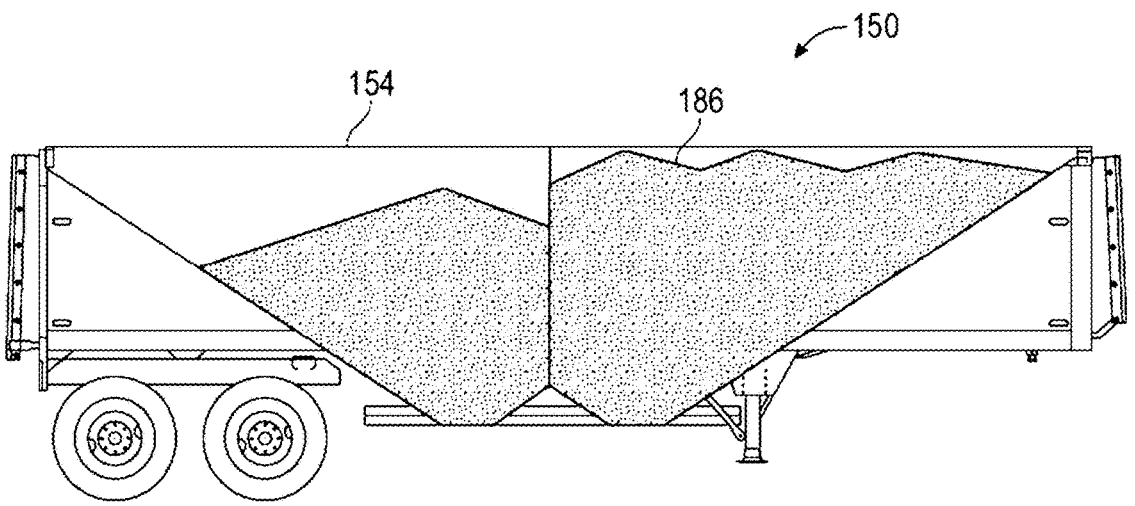
FIG. 7 is a side view of a fourth desired weight distribution of the commodity in the receiving container of FIG. 3.

A fourth desired weight distribution, which can be referred to as a concentrated front axle distribution 186 of the harvested material is illustrated in FIG. 7. More specifically, with the concentrated front axle distribution 186, compared to the amount of harvested material positioned over the rear axle, a greater amount of harvested material is positioned over the front axle of the receiving container 150. Conversely, in yet another embodiment, compared to an amount of harvested material positioned over the front axle, a greater amount of harvested material can instead be positioned over the rear axle of the receiving container 150.

Figure 8:
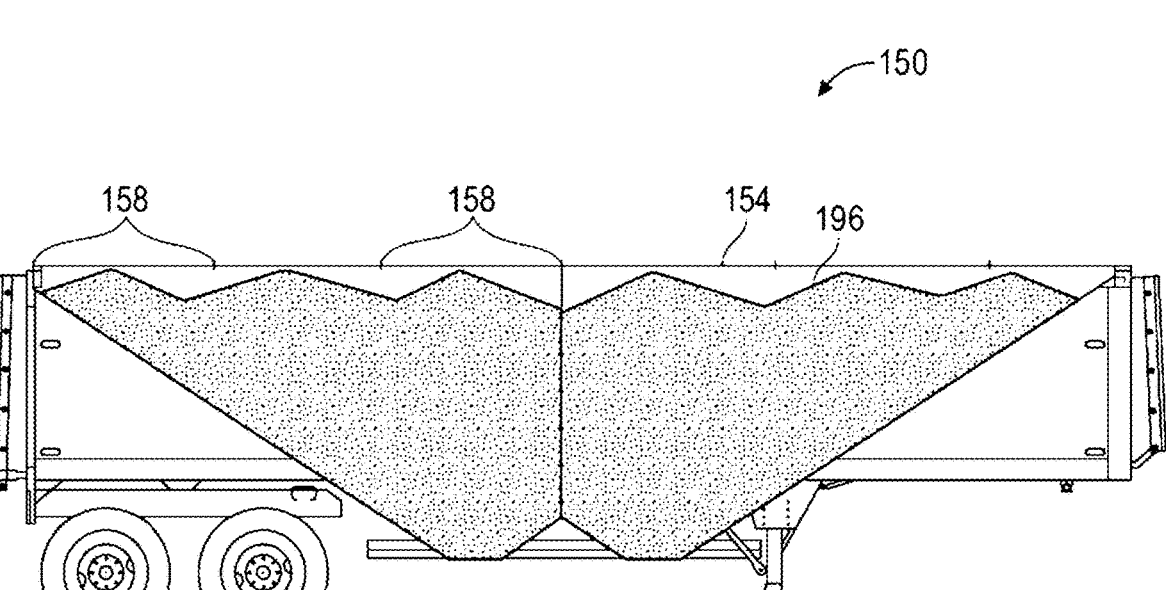
FIG. 8 is a side view of a fifth desired weight distribution of the commodity in the receiving container of FIG. 3.

A fifth desired weight distribution, which can be referred to as a hoop distribution 196 of the harvested material is illustrated in FIG. 8. With the hoop distribution 196, a greater amount of harvested material is positioned between pairs of grain trailer tarp hoops 158 of the receiving container 150, as compared to an amount of harvested material positioned over the grain trailer tarp hoops 158.

Accordingly, the exemplary method 100 can employ one or more of blocks 102, 110, 112, 114, and/or 116 in connection with determining a desired fill profile.

The actual fill profile of the commodity in the receiving container 150, including for example, one or more of the shape(s), distribution(s), height(s), among other features or characteristics of the commodity in one or more portions of the receiving container 150, can be measured via use of at least the sensors 35. Moreover, information obtained by the sensors 35 can be used by at least one or more processors 54, 62 to derive measured fill profile. The accuracy of the measured fill profile can, however, be compromised in at least certain situations. For example, with respect to embodiments in which the sensor 35 is one or more cameras, in certain situations, dust or other debris, shadows, or low light conditions may adversely impact the accuracy of the information obtained by the camera. Such comprising of the information provided by the camera, and thus used by the processor 54, 62 in determining the associated measured fill profile, can adversely impact the accuracy, or reliability, of the determined measured profile fill. According, in connection with the unloading of the commodity into the receiving container, the dill detection system 50 can also be determining a simulated fill profile, as discussed below.

The confidence of the information obtained from the sensor(s) 25 and/or corresponding determined measured fill profile can be determined in a variety of manners. For example, with respect to embodiments in which the sensor (s) 35 is a camera, the controller 52 can evaluate the image or images provided by the camera, including, for example, on a pixel level. Moreover, according to certain embodiments, the controller 52 can evaluate the brightness and/or color, or lack thereof, in the image, including, on a pixel level, to determine whether the image is being obtained in poor light quality, or is obscured by dust or other debris the camera. Further, the results of such evaluations can be evaluated with respect to reference data or information that can be used to identify a corresponding confidence value that is to be assigned to the obtained information. However, a variety of other techniques or criteria can be used in evaluating the confidence level in terms of the accuracy, or lack thereof, of information provided by the sensor(s) or used in determining the measured fill profile.

Figure 9:
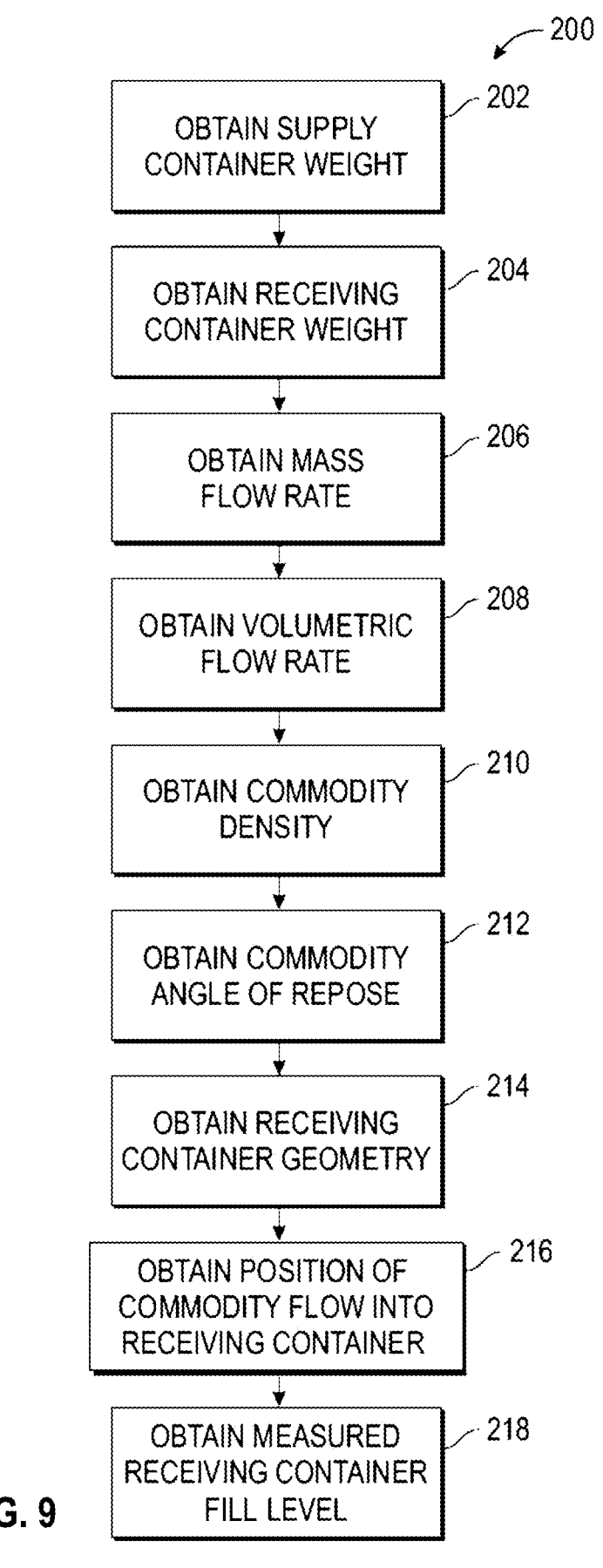
FIG. 9 is a flow diagram of a method of determining a simulated fill profile of the commodity as commodity is passed into the receiving container of FIG. 3 in accordance with one embodiment.

FIG. 9 is a flow diagram of an exemplary method 200 of determining a simulated fill profile for the commodity, which, in this example, is again a harvested material, which has been and/or is being unloaded into the receiving container 150. The method 200 corresponds to, or is otherwise associated with, performance of the blocks described below in the illustrative sequence of FIG. 9 and can be performed, for example, by the fill detection system 50, including, but not limited, by at least the controller 52. It should be appreciated, however, that the method 200 can be performed in one or more sequences different from the illustrative sequence. Additionally, one or more of the blocks mentioned below may not be performed, and the method 200 can include steps or processes other than those discussed below.

As discussed below, the simulated fill profile may be utilized at least in instances in which conditions, including external conditions, may at least temporarily prevent or compromise the sensor(s) 35 from obtaining, or continuing to obtain, accurate information for determining the measured fill profile. Thus, rather than using information obtained by the sensors 35, the simulated fill profile can be attained using one or more fill algorithms that can utilize various input information, including, but not limited to, one or more simulated fill profile parameters, as discussed below.

At block 202, one or more simulated fill profile parameters can be determined. For example, with respect to the illustrated method 200, at block 202 a simulated fill profile parameter in the form of a supply container weight can be determined, including retrieved or derived, for the supply container 30. In one embodiment, the supply container 30, along with the commodity contained in the supply container 30, which, again, can be a harvested material, is measured to determine a gross weight. In another embodiment, the weight of an empty the supply container 30, i.e., without the commodity therein, is known, and the quantity of commodity (e.g., harvested material) accumulated in the supply container 30 is determined and combined with the known weight of the empty supply container 30 to determine the gross weight.

At block 204, another simulated fill profile parameter can be determined, which, in this example, is the receiving container weight, which can be the weight of the receiving container 150. According to certain embodiments, determining the receiving container weight can include determining whether any commodity is currently does, or does not, have commodity in the receiving container 150, and, if commodity is present, adjusting the weight of the receiving container 150 to include the weight of that commodity. Determining whether, and how much, commodity is within the receiving container 150 can, for example, include determining whether the receiving container 150, and moreover the interior area 151 of the receiving container 150, is, or is not, covered. According to certain embodiments, the visual system 58 and/or controller 52 is configured to determine, such as via use of information provided by one or more sensors 35 of the visual system 58, if the receiving container 150 is covered, including, for example, covered via a roll tarp or other trap system. If the visual system 58 and/or controller 52 determines the receiving container 150 is not covered, the visual system 58 can use the one or more sensors 35 to determine whether the receiving container 150 is empty or includes at least some commodity. Further, if the receiving container 150 is identified by the visual system 58 and/or controller 52 as containing commodity, the visual system 58 can utilize the one or more sensors 35 to provide information further indicating, or used to determine, including estimate, an amount of commodity in the receiving container 150, including, for example, a weight of the commodity in the receiving container 150. In one embodiment, the receiving container weight of the receiving container 150 is measured as gross weight of the receiving container 150 and any of the commodity, if any, therein. Additionally, according to certain embodiments, to the extent commodity is present in the receiving container 150, the receiving container weight of the receiving container 150 can be adjusted to account for the position of the commodity within the receiving container 150, as, again, may be identified by the visual system 58 and/or controller 52 using information obtained by the one or more sensors 35 of the visual system 58.

At block 206, another simulated fill profile parameter can be determined, such as, for example, a commodity (e.g., harvested material) flow rate, which can correspond to the rate of commodity flowing into the receiving container in units of either mass or volume per time. To unload the commodity from the supply container 30, the supply container 30 can employ the conveyance device 37 to draw commodity, such as, for example, grain, from at least the bottom of the supply container 30 and carry the grain through the chute 36 that deposits the grain in the receiving container 150, or wherever else the grain is needed. As previously mentioned, in some embodiments, the conveyance device 37 can comprise an auger. To provide power to the auger, the supply container 30 is typically driven by a Power Take-Off ("PTO") driveshaft located at the rear end of the tractor 31. A hopper gate can be present at the bottom of the supply container 30, where the auger meets the bottom of the supply container 30. The hopper gate is typically to be in an open position such for grain to flow onto the auger. The hopper gate can be actuated and powered by hydraulics or electricals of the tractor 31. The hopper gate can keep the harvested material in the supply container 30 until the operator desires to remove the harvested material. In one embodiment, the mass flow rate of the harvested material can be determined using at least a weight of the commodity delivered to the receiving container 150, as may be directly or indirectly determined using a scale weight measurement, including differences in scaled weights over time, the gate position, and/or the PTO speed, among other information.

At block 208, another simulated fill profile parameter can be determined, such as, for example, a volumetric flow rate of the commodity (e.g., harvested material). According to certain embodiments, the controller 52, which again, may or may not be part of the visual system 58, can determine, including estimate, a volume measurement of the commodity that is placed or discharged into the receiving container 150. Such a volume measurement can be determined by the controller 52 in a variety of manners, including, for example, using information provided by one or more sensors 35 of the visual system 58. For example, according to certain embodiments, the sensors 35 can attain information regarding a volume of commodity in the form of harvested material passing from, or through, the chute 36 of the supply container 30. Additionally, or alternatively, one or more sensors 35 can attain information regarding the profile, including height(s) at one or more, including a plurality, of locations that the commodity is distributed within the receiving container 150, which the controller 52 can use with geometric and/or size information for the receiving container 150 to determine the volume of commodity (e.g., harvested material) in the receiving container 150. From the volume measurement of the discharged harvested material, the volumetric flow rate of the harvested material can be determined.

Additionally, at block 210, another simulated fill profile parameter, such as, for example, a commodity density of the commodity discharged from the supply container 30 and/or into the receiving container 150 can be determined. For example, information provided by the one or more sensors

35 of the visual system 58, among other information, can be used by the controller 52 to determine the commodity density of the discharge commodity (e.g., harvested material) that is placed in the receiving container 150. From the volume measurement, the commodity density of the harvested material is determined.

At block 212, another simulated fill profile parameter can be determined, such as, for example, a commodity angle of repose of the discharged harvested material. Moreover, the controller 52 can determine the commodity angle of repose of the discharged harvested material that is placed in the receiving container 150. According to certain embodiments, the commodity angle of repose can be determined using information obtained by the one or more sensors 35 of the visual system 58, and can be indicative of the angle of a collection or pile of the commodity at a location at which the commodity is stable within the receiving container 150 relative to a horizontal plane. As can be appreciated, the commodity angle of repose can change as the harvested material continues to fill the receiving container 150.

At block 214, another simulated fill profile parameter can be determined, such as, for example, a receiving container geometry of the receiving container 150. The controller 52 can determine the receiving container geometry of the receiving container 150 in a variety of manners. As can be appreciated, the receiving container geometry of the receiving container 150 can be the same as the receiving container geometry discussed above with respect to block 102 of FIG. 2. In one embodiment, the receiving container geometry of the receiving container 150 can be discretized as either a two-dimensional or one-dimensional grid with a height and volume to the top of the receiving container 150 for each cell, as discussed below with respect to the grids 900, 1000 shown in FIGS. 10 and 11, respectively. The grid may also have a commodity slope for the top of each cell. When the receiving container 150 is empty, the cell values as plotted will simply look like the bottom of the receiving container 150.

Figure 10:
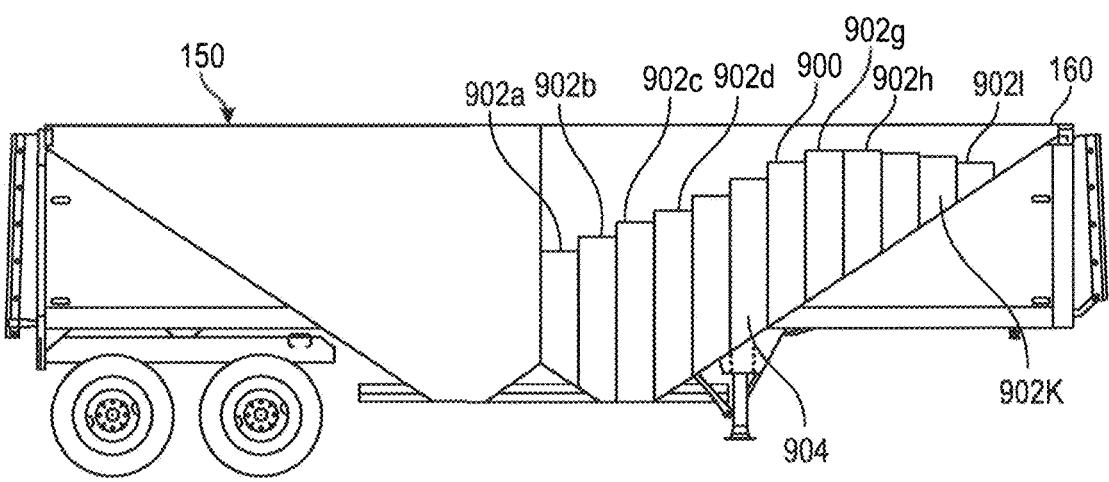
FIG. 10 is a side view of a one-dimensional grid illustrated in the receiving container of FIG. 3.

In the exemplary one-dimensional grid 900 illustrated in FIG. 10, the receiving container 150 is calculated as one-dimensional slices 902a-9021. In this example a commodity pile 904 in a front portion 160 has been represented as twelve (12) one-dimensional slices 902a-9021. However, there may be other embodiments with additional or fewer one-dimensional slices than those illustrated in FIG. 10. In the illustrated example, each of the one-dimensional slices 902a-9021 has the same width. Further, each of the one-dimensional slices 902a-9021 can have a unique height. Preferably, each of the one-dimensional slices 902a-9021 will not have a slope at the top of the unique height. As commodity, in this example harvested material, flows into the receiving container 150, the cell volumes and heights of the one-dimensional slices 902a-9021 will be updated based on the flow into the receiving container 150 and the angle of repose of the commodity.

Figure 11:
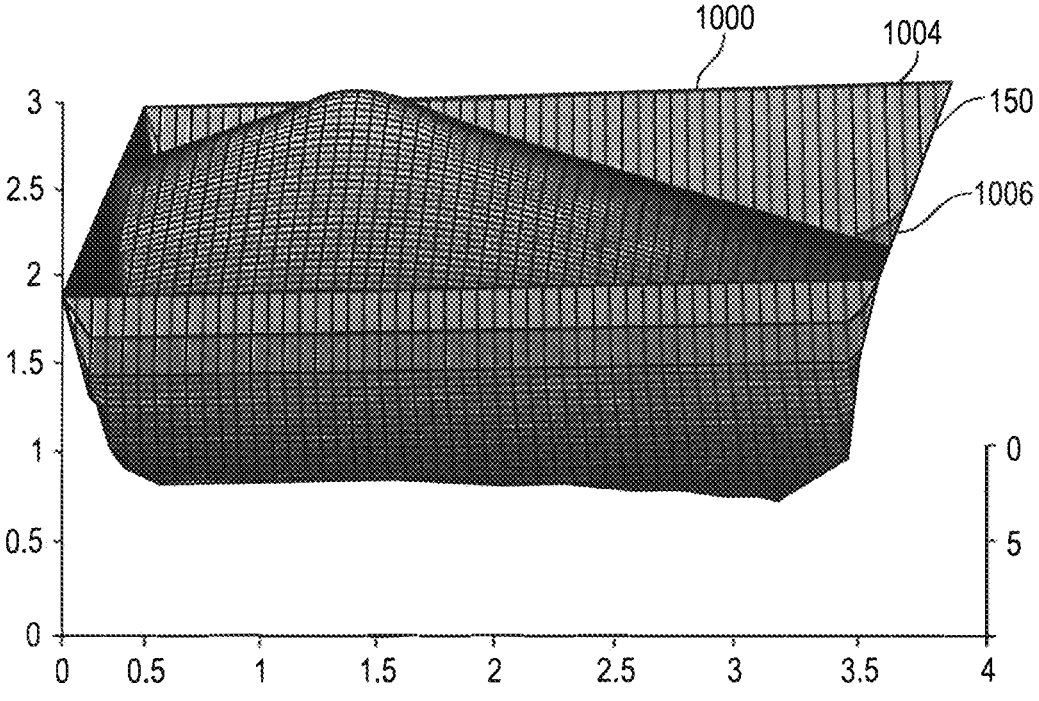
FIG. 11 is a perspective view of a two-dimensional grid illustrated in the receiving container of FIG. 3.

In the exemplary two-dimensional grid 1000 illustrated in FIG. 11, the receiving container 150 includes a commodity pile 1004 that is represented as the two-dimensional grid 1000. The two-dimensional grid 1000 has a volume and height for each cell wherein an illustrative cell 1006 is shown. In addition, a slope can be determined for each of the cells, which provides more accuracy as to the information provided by the two-dimensional grid 1000 then the one-dimensional grid 900, which has no slope. According to certain embodiments, the slope can correspond to the commodity angle of repose. As commodity flows into the receiving container 150, the flow rate and angle of repose is used in an iterative process to predict the new commodity height. As the receiving container 150 fills, the combined cells values, volume, height and slope will represent the commodity pile 1004. Further, the grid 1000 shown in FIG. 11 illustrates an example in which the receiving container 150 is approaching full on the left side of the receiving container 150, and the receiving container 150 can have more commodity added to the right side of the receiving container 150.

At block 216, another simulated fill profile parameter can be determined, such as, for example, a position of commodity flow, or commodity flow rate position, that can correspond to the location that commodity is flowing into the receiving container 150. The controller 52 can, using information from one or more sensors 35, including cameras, among other sensors, determine a volume measurement of the harvested material in the receiving container 150 and determines an actual weight measurement of the discharged harvested material in the receiving container 150.

According to certain embodiments, at block 218, another simulated fill profile parameter that can be determined or provided is the above-discussed measured fill profile. As previously indicated, the measured fill profile can be obtained using information from one or more sensors 35, including, for example, a camera(s), among others, that can be used to determine a distance from the top edge 154 of the receiving container 150 to a top surface of the commodity. However, in another embodiment, the controller 52 determines a volume measurement of the commodity in the receiving container 150 and adjusts the distance from the top edge 154 to the top surface 156, 168 of the commodity. Optionally, a confidence of the measured fill profile is determined, and the measured fill profile is adjusted accordingly.

Accordingly, method 200 can employ one or more of blocks 202, 204, 206, 208, 210, 212, 214, 216, and/or 216 to determine a simulated fill profile of the commodity (e.g., harvested material). The simulated fill profile of the commodity can be determined in real time as commodity is being deposited into the receiving container 150. The simulated fill profile is useful since the measured fill profile accuracy may change drastically as a function of dust and lighting, which can obstruct a field of view of the one or more sensors 35 being utilized by the visual system 58. Moreover, the position of sensor(s) 35 of the visual system 58, such as, for example, a camera position, and fill profile of the commodity can also change drastically and quickly as additional commodity is added to the receiving container 150.

The method 200 can also include the fill detection system 50 employing a Kalman filter, a sensor fusion algorithm, an iterative process, a machine learning model (as generally indicated in FIG. 1B by the AI engine 68 and associate neural network 70), or other techniques to combine one or more of blocks 202, 204, 206, 208, 210, 212, 214, 216, and/or 216 to determine the simulated fill profile at any given point in the receiving container 150. Moreover, according to certain embodiments, a measurement of a final fill of the commodity in the receiving container 150 can be utilized to adjust one or more filter coefficients so as to adjust for future fills of commodity in the receiving container 150. For example, the final fill of the commodity in the receiving container 150 can be the amount and/or configuration of the commodity in the receiving container 150 at the instance that no additional commodity is placed in the receiving container 150. In other words, the final fill can correspond to the receiving container 150 being "full" at least in terms of the commodity that is deposited into the receiving container 150. The final fill of the harvested material in the receiving container 150 can depend on any of the blocks 102, 110, 112, 114, and/or 116 from FIG. 2, or blocks 202, 204, 206, 208, 210, 212, 214, 216, and/or 216 from FIG. 9. For example, the final fill of the commodity can be limited by the maximum desired fill profile, as discussed above, for example, with respect to block 110. As another example, the final fill of the commodity can be limited by the maximum desired commodity weight, as discussed, for example, with respect to block 112. As yet another example, the final fill of the commodity can be limited by the desired weight distribution of the harvested material, as discussed above, for example, with respect to block 116.

The final fill of the commodity can be determined by the controller 52 using information provided by the one or more sensors 35, including for example, a camera(s), of the visual system 58 that is/are mounted on the supply container 30, the tractor 31, and/or the receiving container 150. Some examples of filter coefficients include Kalman filter coefficients or machine learning that can be adjusted based on the final fill determination. For example, if the maximum weight is the limiting factor, and the final fill of the commodity in the receiving container 150 is less than the maximum weight, the filter coefficients can be adjusted so as to increase the quantity of commodity that will be, or is being, dispensed into the receiving container 150 with the next instance that the receiving container 150 is filled. Moreover, in such an example in which the maximum weight is the limiting factor, the filter coefficients can be adjusted in a manner that adjusts the quantity of commodity that will be deposited into the receiving container 150 in at least an attempt to reach the maximum weight.

Moreover, there may be situations that the one or more sensors 35 of the visual system 58 that is/are mounted on the supply container 30, the tractor 31, and/or the receiving container 150 is/are not operable due to poor environmental conditions. For example, with respect to commodity that is in the form of a harvested material that is grain, in certain situations grain dust may prevent the one or more sensors 35*a-d* that are mounted on the supply container 30, the tractor 31, and/or the receiving container 150 from properly seeing the grain level within the interior area 151 of the receiving container 150. Further, in certain instances, one or more of the sensors 35*a-d* may, at least initially, work fine, including, for example, provide accurate information, while grain is being unloaded into the receiving container 150 before a change in the environment, such as, for example a change in wind direction increasing a presence, quantity, or extent of grain dust that inhibits or interrupts the sensors 35*a-d* from being able to obtaining further, or accurate, information while the grain continues to be unloaded into the receiving container 150, thereby compromising, if not prevent, normal operation of the fill detection system 50. In such situations, the fill detection system 50 can use other inputs to calculate a simulated fill profile. Moreover, the simulated fill profile can be used by the controller 52 to allow the supply container 30 to unload, or continue to unload, grain, as well as start/stop the unloading operation and/or move the conveyance device or supply container 30 in a manner that can achieve a reasonable fill of commodity in the receiving container 150 even though external conditions may, at least temporarily, prevent the sensors 35*a-d* of the visual system 58 from obtaining accurate information. Moreover, in certain embodiments, the controller 52 can utilize information provided by the stimulated fill profile to adjust the location of the supply container 30, the unloading spout or chute 36 of the supply container 30, and/or or the receiving container 150 so that the desired fill profile of the commodity in the receiving container 150 is achieved. Accordingly, when the measured fill profile is not accurate enough to be useful, the algorithm of, or associated with the simulated fill profile can be utilized to control the filling of the commodity in the receiving container 150, including used to make position adjustments without help of the visual system 58.

As discussed below, one or both of the measured fill profile and the stimulated fill profile can used by the fill detection system 50 to generate an estimated fill profile. Moreover, as also discussed below, the contribution of each of the measured fill profile and the stimulated fill profile to the estimated fill profile determination can be proportional to a confidence in the accuracy of at least some of the underlying information used to determine either or both the measured fill profile and the stimulated fill profile. For example, the weight or value of the measured fill profile to the determination of the estimated fill profile may be directly proportional to a determined confidence in the accuracy of the information provided by one or more of the sensors 35 used in determining the measured fill profile. Similarly, according to certain embodiments, the weight or value of the simulated fill profile to the determination of the estimated fill profile may be directly proportional to a determined confidence in the accuracy of the algorithm or other information used, or provided to determine the simulated fill profile.

Figure 12:
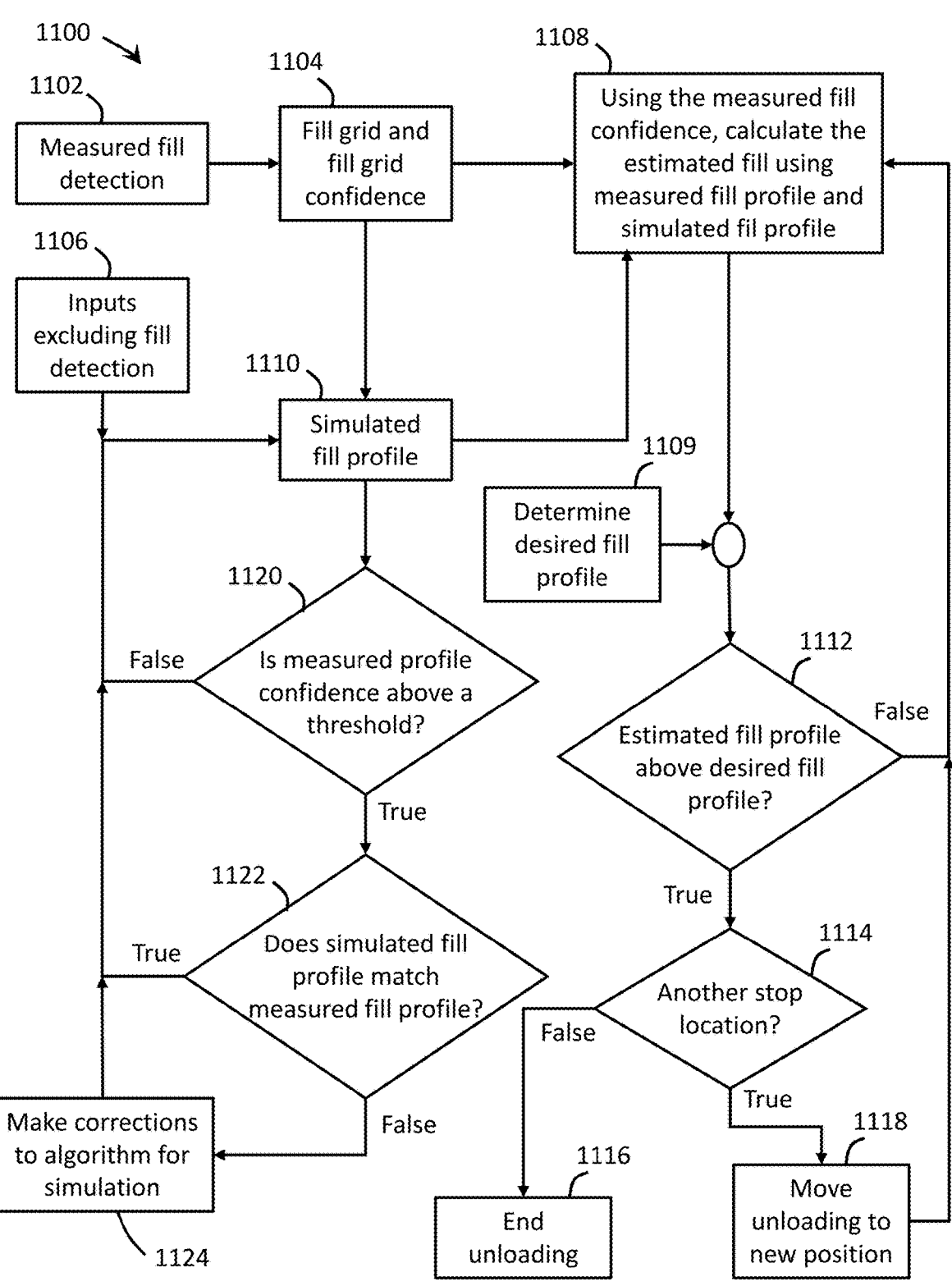
FIG. 12 is a flow diagram of an exemplary algorithm for determining an estimated fill profile for a commodity in the receiving container and machine learning for adjusting an algorithm used for determining the simulated fill profile.

Referencing FIG. 12, an algorithm 1100 for determining the estimated fill profile is provided. The illustrated algorithm 1100 can be used, such as, for example, by the controller 52, concurrently as the receiving container 150 is being filled with the commodity. The algorithm 1100 can use any combination of available data, including data associated with the above-discussed desired fill profile, measured fill profile, and simulated fill profile. Thus, for example, the estimated fill profile can be based, at least in part, on data relating to one or more of either, or both, the desired fill profile parameters and/or the simulated fill profile parameters, discussed above. Such data can thus include, but is not limited to, supply container weight, receiving container weight, expected angle of repose, commodity density, receiving container geometry, container relative positions, and/or supply container spout position to generate a live model of the container fill, and, moreover the fill profile for the commodity in the storage container 150.

Additionally, as previously discussed, when the measured fill profile is being made accurately, such as, for example, operation of the sensors 35 is not compromised by lighting or airborne debris, including dust, among other environmental ore non-environmental factors, the coefficients utilized determining the estimated fill profile, including, for example, in connection with a Kaman filter or sensor fusion, can be adjusted to assign different weights or value to the determined measured fill profile and the simulated fill profile. For example, according to certain embodiments, when a Kalman filter is employed in connection with the algorithm 1100 for the determination of the estimated fill profile can, for example, be expressed as:

> estimated fill profile=(1−measured fill profile confidence)(previous estimated fill profile+simulated fill profile change)+(measured fill profile confidence)(measured fill profile)

wherein: "fill detection confidence" can reflect a confidence of an accuracy of a measurement of derived from information provided by the sensor(s) 35 of the visual system 58; "previous estimated fill profile" corresponds to a preceding determination of the estimated fill profile; "simulated fill profile change" is an expected change to the fill profile of the commodity, as may be indicated by the simulated fill profile, since the prior determination of the estimated fill profile; and, "measured fill profile" is the fill profile, is measured or actual fill profile based at least on information obtained using the one or more sensors.

According to such an example, if the measured fill profile confidence is near 0, then less, if any, weight or consideration is given to the measured fill profile, and moreover, the simulated fill value is given more weight or consideration for the determination of the estimated fill profile. This can occur, for example, in extremely dusty environments, or if the commodity level is low enough that either or both of the vertical walls 146, 148 of the receiving container 150 are impeding the view of the commodity from the one or more sensors. Accordingly, in certain instances, the fill detection confidence may change as the receiving container 150 is being filled with the commodity. Conversely, if the confidence in the information being obtained by the sensor(s) for the measured fill profile determination is high, then the above equation indicates that more, if not all, weight or consideration is given to the measured fill determination and little, if any, weight or consideration is given to the simulated file profile in determining the estimated fill profile.

FIG. 12 illustrates an exemplary embodiment of the algorithm 1100 for the determining the estimated fill profile for the commodity in the receiving container 150, as well as a method of adjusting the algorithm for the simulated fill profile determination. According to certain embodiments, the algorithm 1100 can be performed by the controller 52, and be based on a variety of information. For example, the algorithm 1100 can use the measured fill profile (as indicated by block 1102), as discussed above. Moreover, as discussed above, the measured fill profile can, for example, be determined using information of commodity in the receiving container 150, as obtained using one or more sensors, such as, for example, cameras or stereo cameras. Further, information regarding the fill grid 900, 1000, as discussed above, can also be utilized by the algorithm 1100, as well as a value or other information regarding a confidence for the fill grid 900, 1000, which may be similar to the above-discussed confidence for information obtained by sensor 35. The algorithm 1100 can also include inputs excluding fill detection 1106, such as, for example, one or more inputs from a supply container scale, a receiving container scale, measurement of mass flow rate, volumetric flow rate, and/or grain or commodity moisture, as well as various combinations thereof, among other inputs described above. Moreover, such inputs provided at block 1106 can be similar to at least some of the simulated fill profile parameters discussed above with respect the method 200 illustrated in FIG. 9.

At step 1110, the algorithm 1100 can receive the measured fill detection (step 1102), the fill grid and fill grid confidence (step 1104), and the inputs excluding fill detection (step 1106). Such information can be used in connection with performing self, machine learning, for purposes of improving the algorithm(s), including model(s), used for determining the simulated fill profile, as generally indicated by at least steps 1120, 1122, and 1124. For example, at step 1120, the controller can determine whether the confidence value for the measured fill profile, as discussed above, satisfies a threshold. In other words, the controller may be seeking to identify whether the measured fill profile is deemed to be sufficiently accurate to warrant possible use in an attempt to improve the accuracy of the algorithm(s) used for the simulated fill profile. If the confidence value is satisfied, then at step 1122, the simulated fill profile can be compared to the measured fill profile. If the simulated fill profile is determined to match the measured fill profile, such as, for example, identify a fill profile of the commodity in the receiving container 150 that is generally similar to, or the same as, the measured fill profile of the commodity in the receiving container 150, the simulated fill profile may be deemed to have accurately determined the actual fill profile of the commodity. However, if the simulated fill profile is determined to not match the measured fill profile, then the algorithm used to determine the simulated fill profile may be adjusted in at least an attempt to improve the accuracy of the simulated fill profile. Again, according to certain embodiments, such adjustments may be determined via identifying patterns or discrepancies in terms of at least the differences in the current, as well as prior, simulated fill profile determinations and corresponding measured fill profiles. Thus, according to certain embodiments, such adjustments, which can occur at step 1124, can relate to changes in the values of coefficients, among other variables and considerations used by the algorithm for the simulated fill profile determination.

At least steps 1108 through 1118 can relate to controller 52 determining an estimated fill profile using the measured fill profile and simulated fill profile, and adjusting a position of the supply container 30, and/or associated conveyance device 36, using such determinations. For example, at step 1108, the measured fill profile and the simulated fill profile can be used to determine the estimated fill profile. As also discussed, such a determination of the estimated fill profile can utilize sensor fusion techniques, including use of a Kalman filter, so that, based on a confidence in the information provided by, or used to determine, either or both the measured fill profile and the simulated fill profile, an appropriate weight, value or consideration is given to the measured fill profile and the simulated fill profile in the determination of the estimated fill profile, as previously discussed. At block 1112, the estimated fill profile, as determined at step 1108, can be compared with the previously determined desired fill profile, which is determined at step 1109. The determination of the desired fill profile at step 1109 performed, for example, in a manner similar to that discussed above with respect to the method 100 shown in FIG. 2. If the estimated fill profile is determined at step 1112 to, at least currently, not be above, or match, the desired fill profile, the method 1100 can return to block 1108, wherein another estimated fill profile can be determined as commodity continues to be received in the receiving container 150. However, if the estimated fill profile from step 1108 is determined at step 1112 to be above, or match, the desired fill profile, then at step 1114, wherein the controller 54 can identify if the position of the supply container 30 relative to the receiving container 150 is to change, such as, for example, whether commodity to is to continue to be unloaded into the receiving container 150 but with the container being at a different stop or location. If the relative position of the supply container 30 for unloading the commodity is determined a step 1114 is not to be changed, then at step 1118, the controller 52 can generate one or more signals to facilitate a stoppage of the unloading of commodity from the supply container 30. Otherwise, if the relative position of the supply container is to change, such a move to a new unloading position can occur at step 1118, and the estimated fill profile can continue to be determined at step 1108.

With reference to FIGS. 13, 14, 15A, and 15B, an embodiment of the fill detection system 1200, is shown that again can include a vision processing unit (VPU) 1202, which can have one or more processor or microprocessor-based electronic control units or controllers. The VPU 1202 includes a processor and memory having instructions for execution by the processor. Similar to the VPU 60 shown in FIG. 1B, the VPU 1202 can receive various inputs including a feed from one or more sensors, including for example, a camera or other sensor of a height sensing system, a localization position of the sensor (e.g., camera) relative to a GPS location of the towing vehicle (e.g. tractor 31) or supply container 30, properties of the commodity (e.g., harvested material), and properties of the receiving container 150. The feed from a sensor in the form of a camera can include, for example, raw or processed data or images. The localization can include one or more of a position of the tractor 31, a position of the supply container 30, a position of at least a portion of the conveyance device 31 (e.g., position of the auger), and a position of the sensor (e.g., camera). With respect to embodiments in which the commodity is a harvested material, the properties of the harvested material can include one or more of a type of harvested material, a weight of the harvested material, and a moisture content of the harvested material. The properties of the receiving container 150 can include a size, a capacity, a shape, exterior dimensions, and interior dimensions, among other properties.

Figure 14:
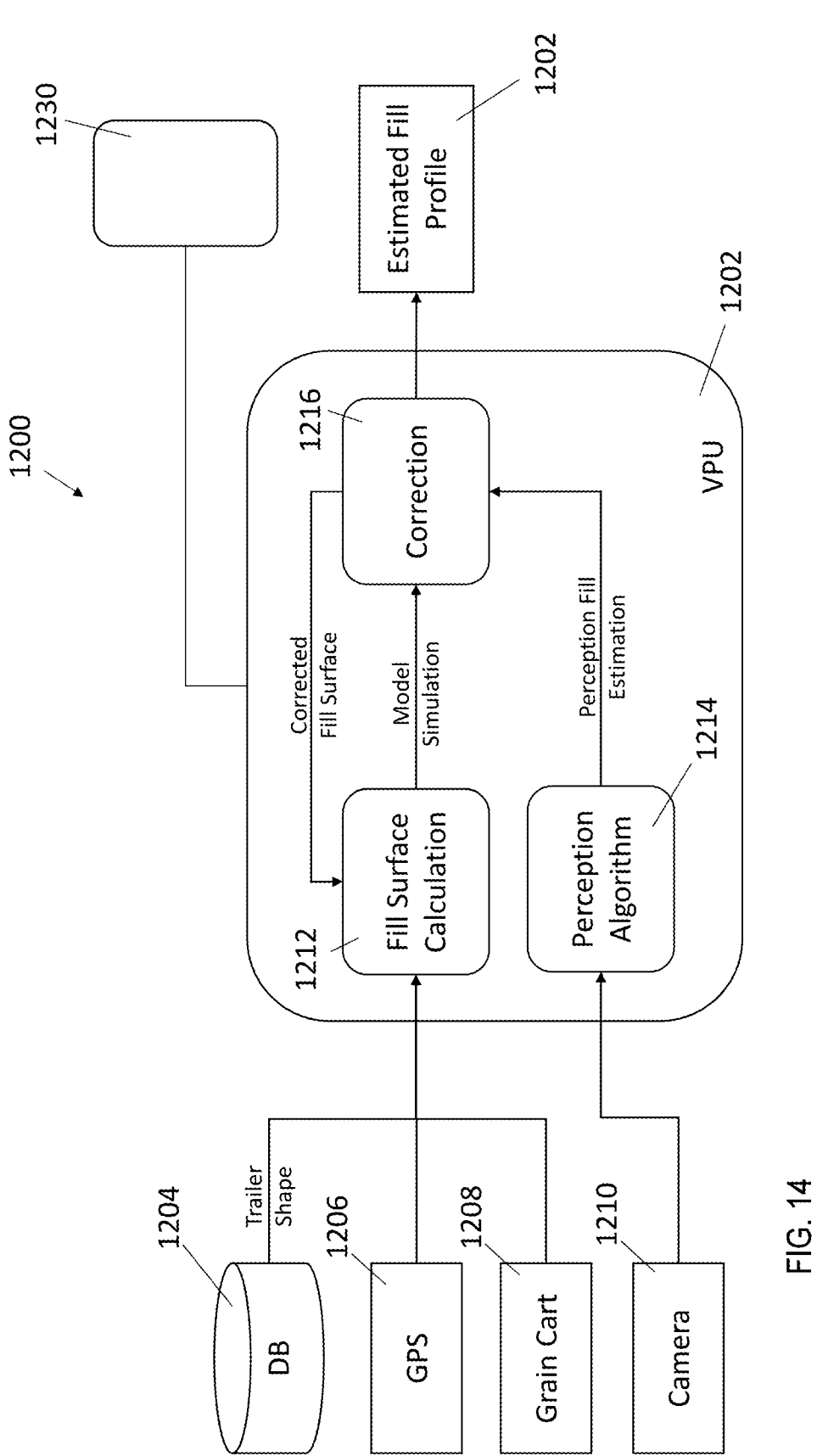
FIG. 14 is a schematic diagram of a system for determining an estimated fill profile of a harvested material.

The VPU 1202 can receive information regarding the receiving container 150 from a local or remote database 1204, including, but not limited to, information regarding the size, shape, and/or position of the receiving container 150. The VPU 1202 can receive location information from a GPS receiver 1206 positioned on the tractor 31 or supply container 30 (which in FIG. 14 is identified as a grain cart) regarding the position of the tractor 31, supply container 30, or both. The VPU 1202 can receive supply container operational information from a control system 1208 of the supply container 30, such as, for example, from an electronic control unit (ECU) having a controller with a processor and memory. Such operational information can include, but is not limited to, the unloading rate of the commodity (e.g., harvested material) and position information regarding the conveyance device 36, such as, for example, an auger position. The VPU 1202 can also receive information from one or more sensors of the visual system, including, but not limited to, visual information from one or more cameras, regarding, or used to determiner, at least the measured fill profile of the commodity in the receiving container.

The VPU 1202 can perform a fill surface calculation at block 1212 for the simulated fill profile (which also may be referred to as a model simulation) based on at least the receiving container information, the GPS location information, and/or the supply container 150 information. The fill surface calculation at block 1212 can result in a determination of the simulation fill profile for the commodity in the receiving container 150. The VPU 1202 can also execute an algorithm at block 1214 (identified in FIG. 13 as a perception algorithm) based on the information from the sensor(s), including, for example, camera information from block 1210 that is used to determine the measured fill profile, which can also be referred to as a perception fill estimation. The VPU 1202 can also perform a comparison at block 1216 based on the simulated fill profile, which may also be referred to as a predicted fill profile, of the commodity (e.g., harvested material) and the measured fill profile to derive the estimated fill profile. As previously discussed, such a comparison at block 1216 can include use of a Kalman filter or a sensor fusion algorithm to assign difference values or weights to the measured fill profile and simulated fill profiles associated with a confidence in the accuracy of those determinations, including a confidence in the accuracy of information used for those determinations. Additionally, the comparison at block 1216 can feed back information regarding improving the algorithm used at block 1212 for the simulated fill profile determination, as discussed above with respect to at least steps 1120, 1122, and 1124 in FIG. 12.

Figure 13:
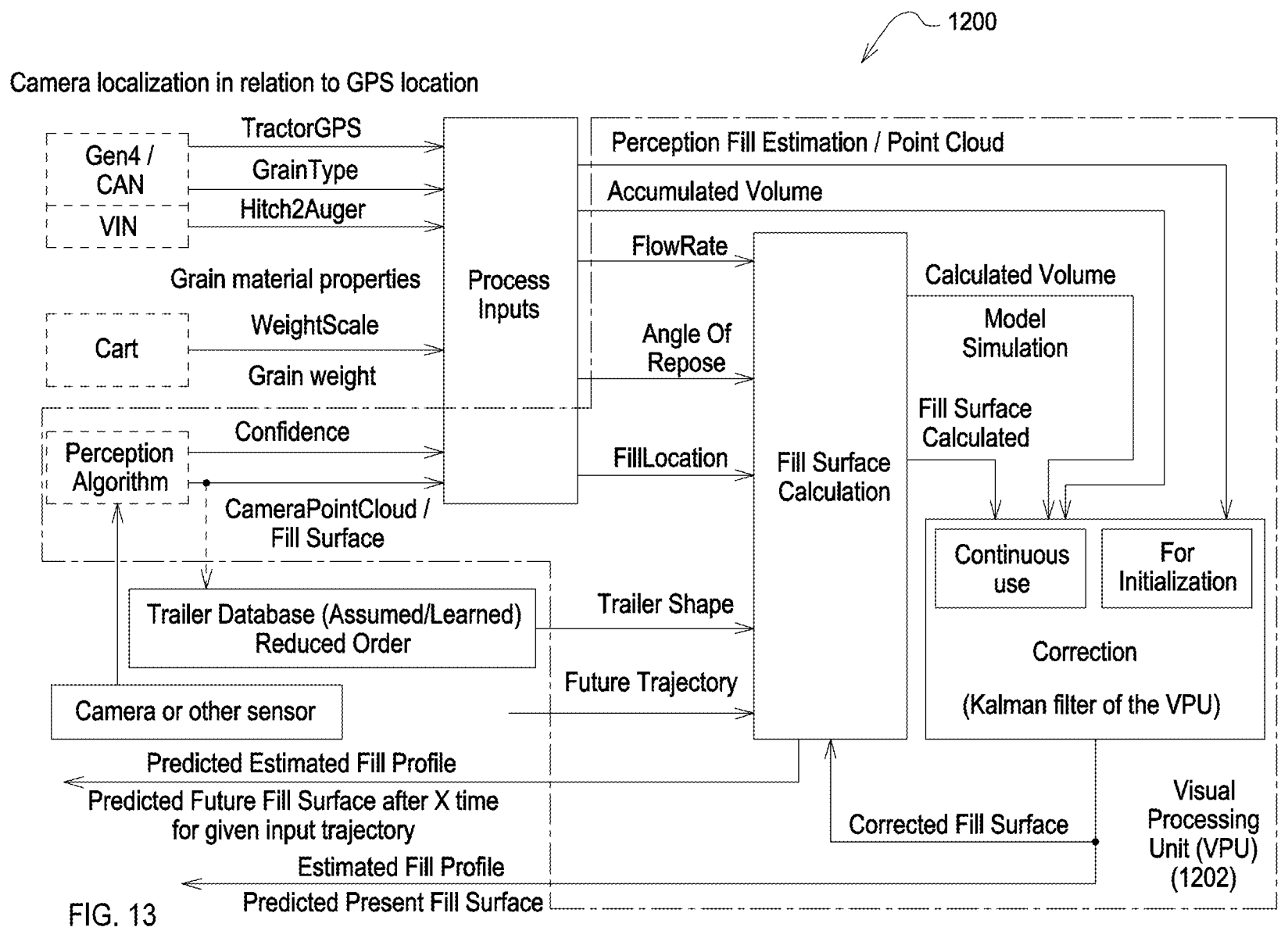
Figure 15B:
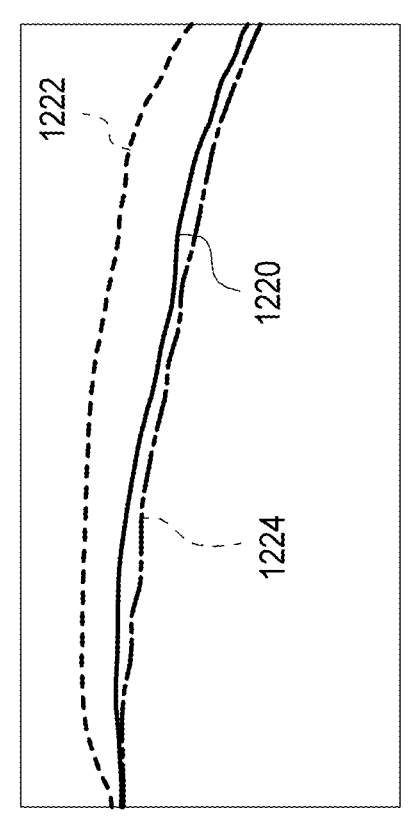
FIG. 15B is a diagram demonstrating an estimated fill profile being closer to a simulated fill profile than a measured fill profile when a confidence level of the measured fill profile is low.
Figure 15A:
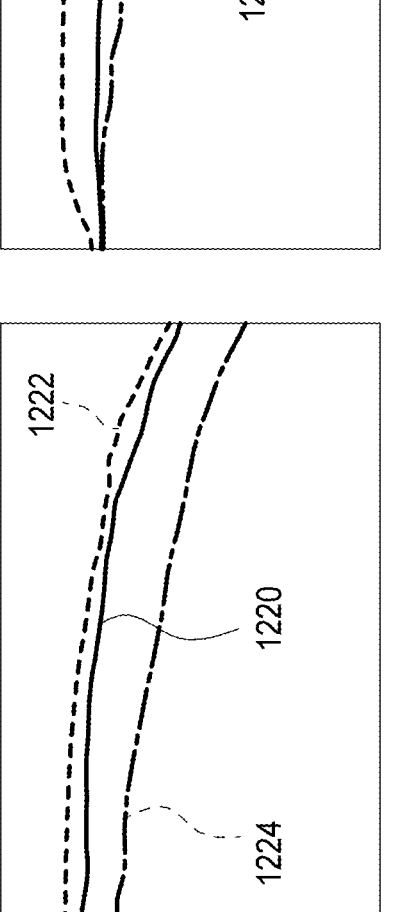
FIG. 15A is a diagram demonstrating an estimated fill profile being closer to a measured fill profile than a simulated fill profile when a confidence level of the measured fill profile is high.

The comparison, as identified in FIG. 13 as "correction" at block 1216 creates an estimated fill profile, as identified by block 1220. FIGS. 15A and 15B illustrate examples of the influence high and low confidence values can have with respect to determined estimated fill profile. When the confidence of the vision data from the sensor(s) (e.g., camera) is high, as represented by the diagram shown in FIG. 15A, the estimated fill profile 1220 more closely resembles the measured fill profile 1222. Conversely, when the confidence of the vision data from the sensor(s) (e.g. camera) is low, the estimated fill profile 1220 more closely resembles the simulation fill profile 1224, as seen in FIG. 15B. Accordingly, as the confidence in the information from the sensor(s) increases, the estimated fill profile 1220 moves closer to the measured fill profile 1222. As the confidence in the information from the sensor(s) decreases, the estimated fill profile 1220 moves closer to the simulation fill profile 1224. The VPU 1202 can display the estimated fill profile 1220 or information related to the estimated fill profile 1220 on a local or remote display 1230, for example any local or remote electronic device with a screen or monitor, including, but not limited to, the I/O device 66.

While this disclosure has been described with respect to at least one embodiment, the present disclosure can be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

The invention claimed is:

1. A system for controlling a discharge of a commodity into a receiving container from a supply container, the system comprising:
   at least one sensor positioned to detect at least a height of a portion of the commodity positioned at one or more locations in the receiving container;
   at least one processor; and
   a memory coupled with the at least one processor, the memory including instructions that when executed by the processor cause the at least one processor to:
      determine a simulated fill profile of the commodity in the receiving container based at least on information regarding a geometry of the supply container and a rate at which the commodity is discharged into the receiving container;
      sense, using the at least one sensor, at least the height of the portion of the commodity positioned at the one or more locations in the receiving container;
      determine, using at least the height sensed by the at least one sensor, a measured fill profile of the commodity in the receiving container;
      apply a confidence value to at least one of the measured file profile to attain an adjusted measured fill profile and the simulated fill profile to attain an adjusted simulated fill profile;
      determine an estimated fill profile of the commodity in the receiving container based on the adjusted simulated fill profile and the adjusted measured fill profile; and generate one or more signals for control, using the determined estimated fill profile, an operation for the discharge of the commodity to the receiving container.

2. The system of claim 1, wherein the memory further includes instructions that when executed by the processor cause the at least one processor to determine the simulated fill profile using at least the geometry of the supply container, and the rate at which the commodity is discharged into the receiving container, and at least one of an angle of repose and a location at which the commodity is dispensed in the receiving container.

3. The system of claim 1, wherein the memory further includes instructions that when executed by the processor cause the at least one processor to apply the confidence value to both the measured fill profile and the simulated fill profile, and wherein the confidence value applied to the measured fill profile is different than the confidence value applied to the simulated fill profile.

4. The system of claim 1, wherein the memory further includes instructions that when executed by the processor cause the at least one processor to determine the confidence value, the confidence value being an indication of a determined accuracy of at least information obtained by the at least one sensor.

5. The system of claim 1, wherein the memory further includes instructions that when executed by the processor cause the at least one processor to:
   determine the determined confidence satisfies a confidence threshold;
   compare, in response to the determined confidence satisfying the confidence threshold, the measured fill profile and the simulated fill profile;
   identify, from the comparison of the measured fill profile and the simulated fill profile, at least one difference between the measured fill profile and the simulated fill profile; and
   adjust, based on the identified at least one difference, a model used for the simulated fill profile.

6. The system of claim 1, wherein the memory further includes instructions that when executed by the processor cause the at least one processor to:
   determine a desired fill profile;
   compare the desired fill profile to the estimated fill profile;
   determine, from the comparison of the desired fill profile and the estimated fill profile, at least one of: (1) whether to continue the discharge of the commodity into the receiving container, (2) whether to adjusts a location at which the commodity is discharged into the receiving container, and/or (3) stop the discharge of the commodity into the receiving container.

7. The system of claim 6, wherein the memory further includes instructions that when executed by the processor cause the at least one processor to, from the comparison of the desired fill profile and the estimated fill profile, adjust the location at which the commodity is discharged into the receiving container, by at least generation of one or more signals to facilitate a change of a location of the supply container relative to the receiving container.

8. The system of claim 1, wherein the memory further includes instructions that when executed by the processor cause the at least one processor to determine the simulated fill profile based, at least in part, on at least one simulated fill profile parameter.

9. The system of claim 1, wherein the at least one sensor comprises at least one stereovision camera.

10. The system of claim 1, wherein the measured fill profile includes at least a measured height of the commodity at one or more locations within the receiving container, and wherein the simulated fill profile includes at least a model height for the commodity at the one or more locations within the receiving container.

11. A method for controlling a discharge of a commodity into a receiving container from a supply container, the method comprising:

determining a simulated fill profile of the commodity in the receiving container based at least on information regarding a geometry of the supply container and a rate at which the commodity is discharged into the receiving container;

sensing, using at least one sensor, at least a height of a portion of the commodity positioned in the receiving container;

determining, using at least the height sensed by the at least one sensor, a measured fill profile of the commodity in the receiving container;

apply a confidence value to at least one of the measured file profile to attain an adjusted measured fill profile and the simulated fill profile to attain an adjusted simulated fill profile;

determining an estimated fill profile of the commodity in the receiving container based on the adjusted simulated fill profile and the adjusted measured fill profile; and controlling, using the determined estimated fill profile, an operation for the discharge of the commodity to the receiving container.

12. The method of claim 11, wherein determining the simulated fill profile is based at least on information regarding the geometry of the supply container, the rate at which the commodity is discharged into the receiving container, and at least one of an angle of repose and a location at which the commodity is dispensed in the receiving container.

13. The method of claim 11, wherein applying the confidence value comprises applying a different confidence value to each of the measured fill profile and the simulated fill profile.

14. The method of claim 11, wherein the determined confidence is a confidence value, and wherein the method further includes determining the confidence value, the confidence value being an indication of a determined accuracy of at least information obtained by the at least one sensor.

15. The method of claim 11, further comprising:

determining the determined confidence satisfies a confidence threshold;

comparing, in response to the determined confidence satisfying the confidence threshold, the measured fill profile and the simulated fill profile;

identifying, from comparing the measured fill profile and the simulated fill profile, at least one difference between the measured fill profile and the simulated fill profile; and adjusting, based on the identified at least one difference, a model used for the simulated fill profile.

16. The method of claim 11, further comprising:

determining a desired fill profile;

comparing the desired fill profile to the estimated fill profile;

determining, from the comparison of the desired fill profile to the estimated fill profile, to perform at least one of the following: (1) continuing discharging commodity into the receiving container, (2) adjusting a location at which the commodity is discharged into the receiving container, and/or (3) stopping the discharge of commodity into the receiving container.

17. The method of claim 16, where adjusting the location at which the commodity is discharged comprises changing a location of the supply container relative to the receiving container.

18. The method of claim 11, wherein determining a simulated fill profile is based on at least one simulated fill profile parameter.

19. The method of claim 11, wherein the at least one sensor comprises at least one stereovision camera.

20. The method of claim 11, wherein the measured fill profile includes at least a measured height of the commodity at one or more locations within the receiving container, and wherein the simulated fill profile includes at least a model height for the commodity at the one or more locations within the receiving container.

\* \* \* \* \*